United States Patent [19]
Baughman et al.

[11] Patent Number: 6,017,020
[45] Date of Patent: Jan. 25, 2000

[54] SYSTEM AND METHOD FOR DIFFUSING GAS BUBBLES INTO A BODY OF WATER

[76] Inventors: Michael L. Baughman, Mt. Pleasant, S.C.; Brenton L. Horner, administrator, 334 E. Valerio St., Santa Barbara, Calif. 93101

[21] Appl. No.: 08/021,883

[22] Filed: Feb. 24, 1993

Related U.S. Application Data

[63] Continuation-in-part of application No. 07/911,333, Jul. 8, 1992, abandoned, which is a continuation of application No. 07/776,905, Oct. 16, 1991, abandoned, which is a continuation of application No. 07/618,153, Nov. 23, 1990, abandoned, which is a continuation-in-part of application No. 07/475,896, Feb. 1, 1990, abandoned.

[51] Int. Cl.$^7$ ...................................................... B01F 3/04
[52] U.S. Cl. ........................ 261/36.1; 261/77; 261/122.1; 261/123
[58] Field of Search ....................... 261/77, 87, DIG. 75, 261/36.1, 37, 122.1, 123.93

[56] References Cited

U.S. PATENT DOCUMENTS

| | | |
|---|---|---|
| 1,144,342 | 6/1915 | Andrews . |
| 3,452,966 | 7/1969 | Smolski ..................................... 261/77 |
| 3,852,384 | 12/1974 | Bearden .................................... 261/77 |
| 3,969,446 | 7/1976 | Franklin .................................... 251/87 |
| 4,183,787 | 1/1980 | Poesler et al. ............................. 261/77 |
| 4,272,461 | 6/1981 | Franklin .................................... 261/93 |
| 4,336,144 | 6/1982 | Franklin ................................... 210/758 |
| 4,351,730 | 9/1982 | Bailey et al. ............................. 210/629 |
| 4,629,591 | 12/1986 | Forsyth ................................. 261/122.1 |
| 4,735,709 | 4/1988 | Zipperian .............................. 261/122.1 |
| 4,847,203 | 7/1989 | Smart ....................................... 261/77 |

FOREIGN PATENT DOCUMENTS

| | | | |
|---|---|---|---|
| 2731105 | 1/1979 | Germany ................................. 261/77 |
| 1301291 | 12/1972 | United Kingdom ..................... 261/77 |
| 1473665 | 5/1977 | United Kingdom . |

OTHER PUBLICATIONS

"Ramco Water Recovery Systems," Ramco Sales, Inc., Feb. 1987 Richard E. Speece, "U-Tube Stream Reaeration," *Public Works*, Aug. 1969, p. 111, Ins. 1–4.
Nick C. Parker remarks Jan. 1979 at Texas A&M University.

*Primary Examiner*—Richard L. Chiesa
*Attorney, Agent, or Firm*—James W. Clement

[57] ABSTRACT

System and method for diffusing gas bubbles into a pond, lagoon or basin that is used for fish farming or other form of aquaculture. A small amount of water is continuously removed from the bottom of the body of water by one or more counterflow gas lift diffusers. This small amount of water is flowed down underground, has gas bubbles introduced into it, and is then returned to the body of water. The quantity of water removed and treated in this way is a small fraction of the total body of water in the pond, lagoon or basin. The ratio of (1) the total volume of the channels below ground through which the water flows downward, and then back up into the body of water, to (2) the volume of the body of water above ground is at all times less than about 1:100. In the broadest form of the invention, a gas diffuser introduces gas bubbles into the water in the return channel at a level at least about 2 feet below the bottom of the body of water, and no more then about 50 feet below the surface of the body of water being treated. The downflow and return channels and the space joining them at their bottom ends extend no more than about 50 feet below the surface of the water being treated.

33 Claims, 6 Drawing Sheets

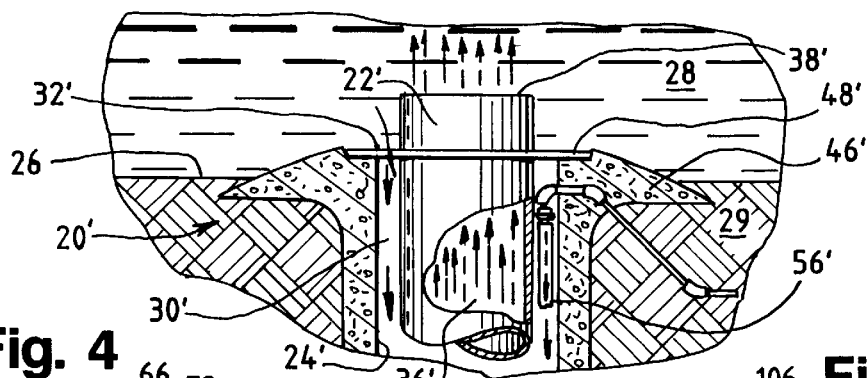
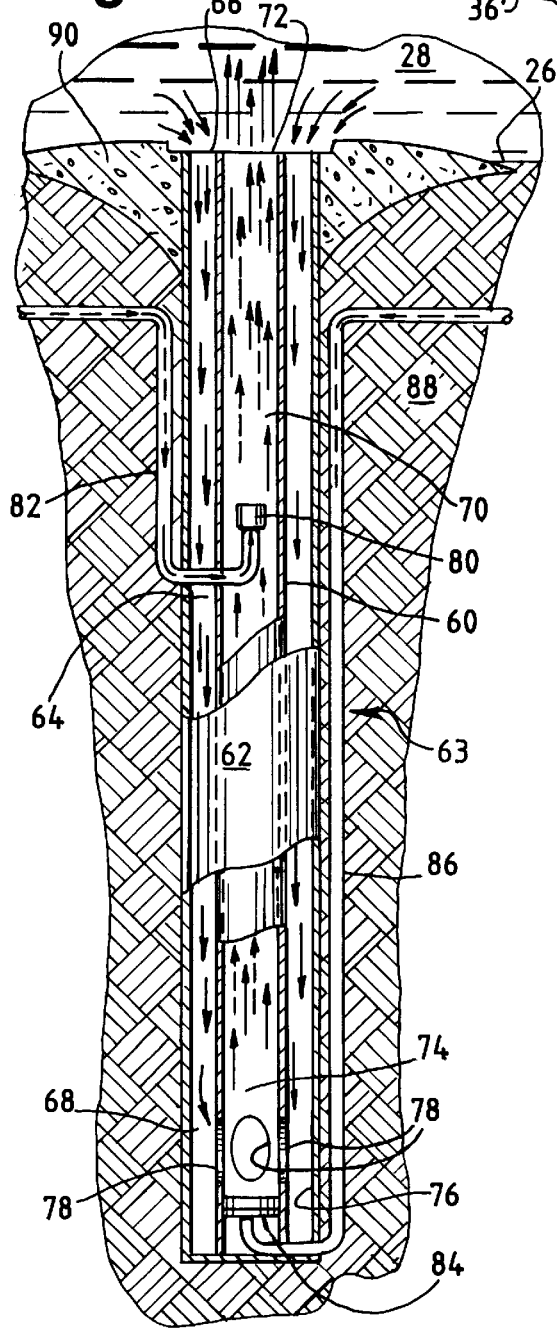
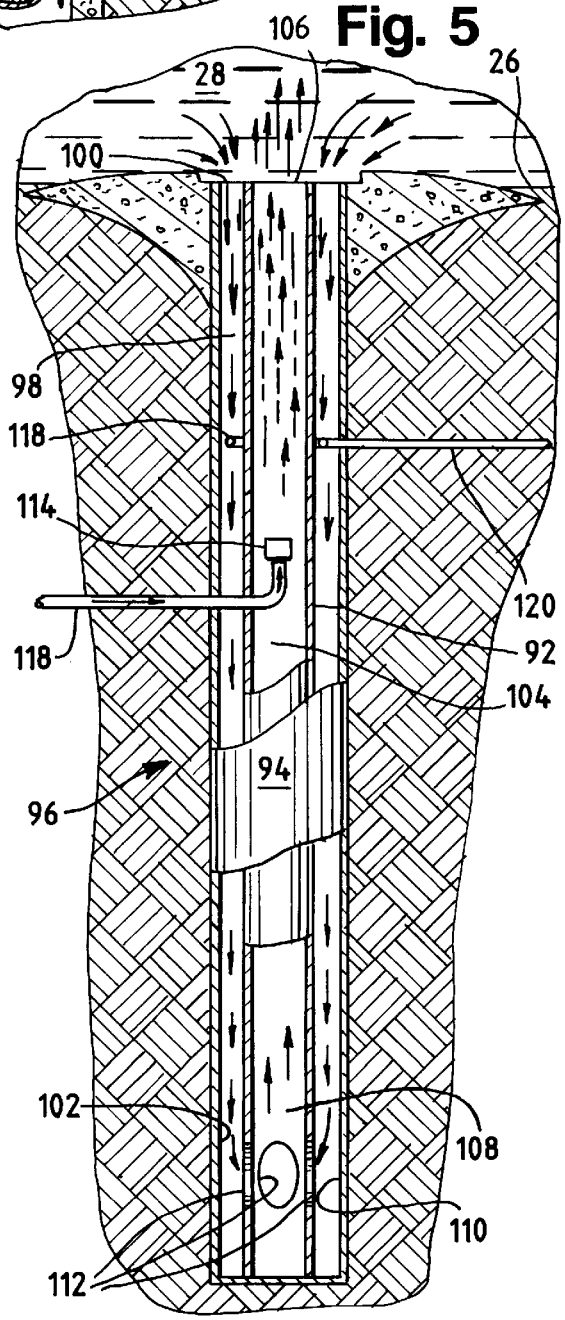

Fig. 9
Fig. 10
Fig. 11
Fig. 13
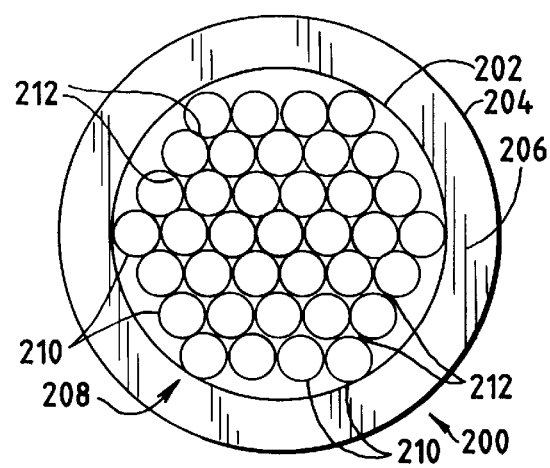
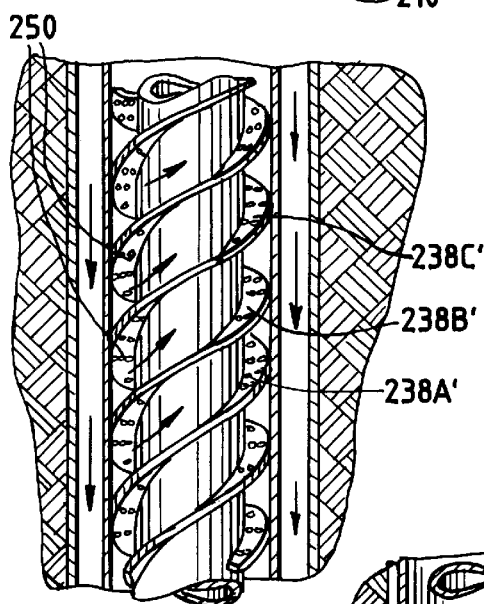
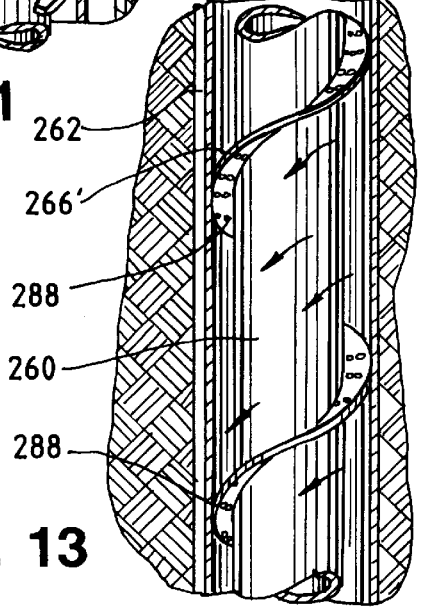
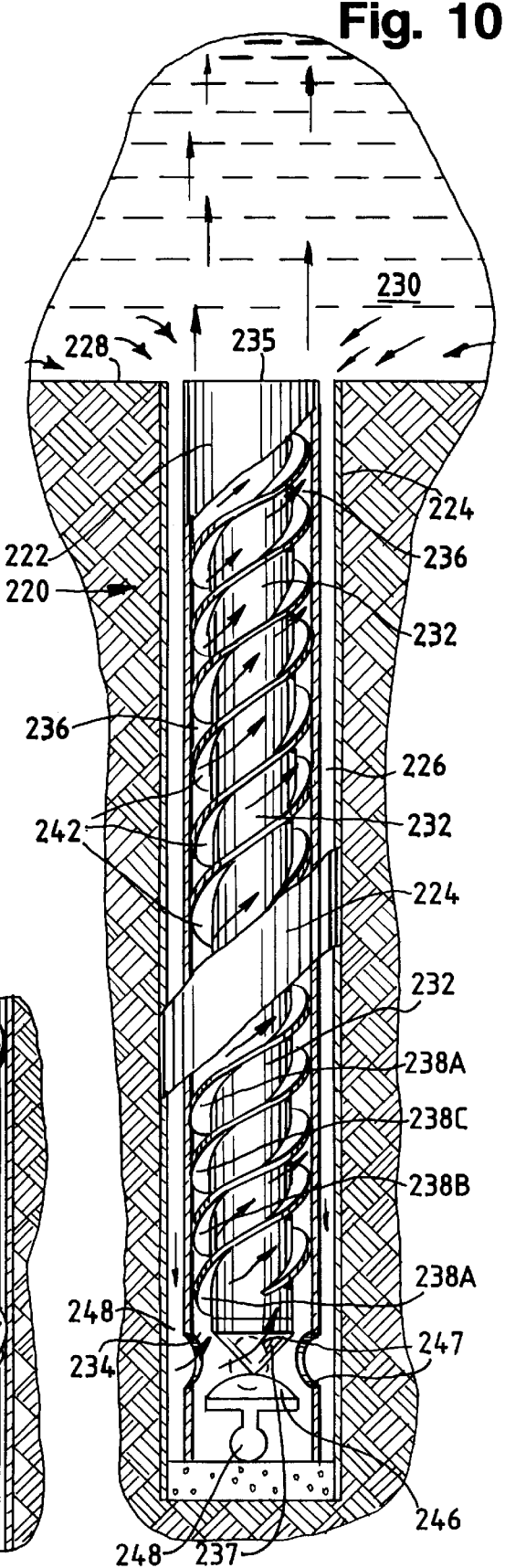

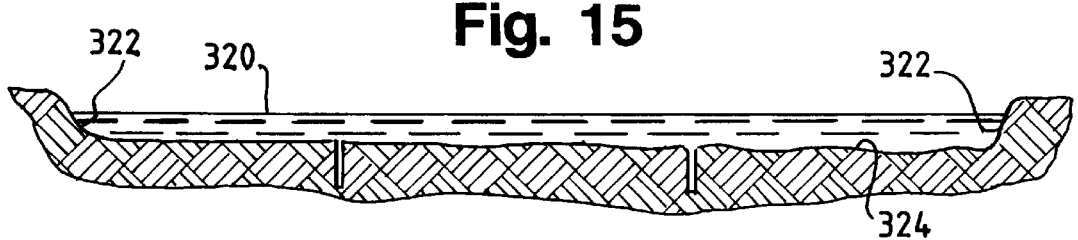
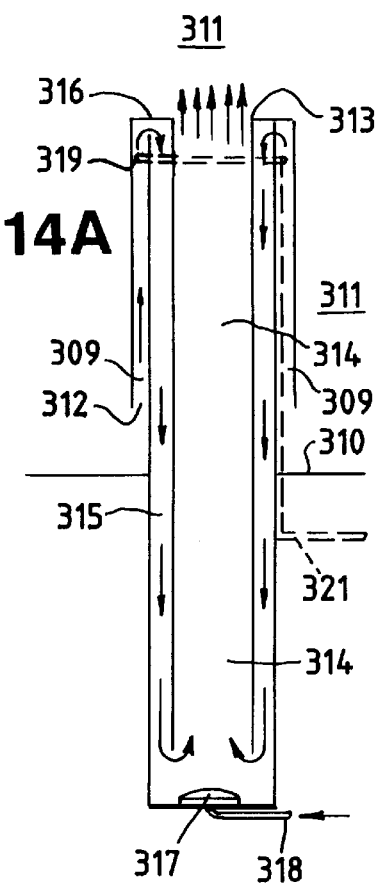

SYSTEM AND METHOD FOR DIFFUSING GAS BUBBLES INTO A BODY OF WATER

This application is a continuation-in-part of application Ser. No. 911,333 filed Jul. 8, 1992, now abandoned, which was a file wrapper continuation of Ser. No 776,905 filed Oct. 16, 1991, now abandoned, which was a file wrapper continuation of Ser. No. 618,153 filed Nov. 23, 1990, now abandoned, which was a continuation-in-part of Ser. No. 475,896, filed Feb. 1, 1990, now abandoned.

FIELD OF INVENTION

This invention relates to a system and a method for diffusing gas bubbles into a body of water that is employed in an aqualculture operation and is substantially confined—as, for example, in a pond, lagoon, tank or other basin—against lateral movement in any direction around its entire perimeter. The invention results in an increase in the gas-liquid contact time, and also an increase in the degree of regasification effected at the surface of the water. Both of these increases significantly improve the gas transfer efficiency for the bubbles that are being introduced into the water.

BACKGROUND OF INVENTION

This invention may be used in the diffusion into a body of water of gas bubbles of any type, and has particular relevance to the diffusion into water of bubbles of air or of pure oxygen. In every case, the principal purpose for which the invention is used is to increase the rate at which a gas is absorbed by a body of water.

Aeration or oxygenation is very important in the operation and maintenance of water lagoons on fish farms or shrimp farms, or other ponds used for the culture of various other forms of aquatic life.

The level of dissolved oxygen can be said to be the most important water quality factor for fish. It is believed that in the operation of a fish farm, oxygen depletion probably results in more economic losses than all other factors combined. The maintenance of adequate oxygen levels is extremely important also in a culture pond for growing shrimp or other forms of aquatic life.

Aeration of a body of water has typically been effected by increasing the area of contact between the air and water through releasing air bubbles into the water below the surface of the water, through agitating the surface water, or both. Methods of agitating surface water include the use of turbines to propel water into the air, the use of paddle wheels to splash the surface of the water, flowing water by gravity over a rough surface, and others.

In the release of air bubbles of various sizes beneath the surface of the water, a variety of types of air diffusers have been employed. In all these devices, some of the air is absorbed as the bubbles rise through the water, and the air that is not absorbed escapes from the surface of the water and may or may not be captured for recirculation.

Prior workers in this field who have addressed themselves to the aeration of the water in a fish culture pond have long recognized the problem presented by the fact that the transit time of air bubbles moving up through the water from an air diffuser resting on the bottom of the container is quite short if the container is shallow. One result of the use of helical tube dividers in U.S. Pat. Nos. 1,144,342, 3,452,966 and 3,852,384 is to increase the gas-liquid contact time as the gas bubbles spiral upward.

Other prior art patents, such as U.S. Pat. Nos. 3,969,446, 4,272,461, and 4,336,144, take a different tack, for the express purpose of improving the absorption of gas in the water being treated. These latter patents do not attempt to increase the gas-liquid contact time, either by the expedient employed by applicant or by any other means but instead disclose measures to convert large "slugs" or "blurps" of air into fine gas bubbles.

One example of this latter type of device is an aerator made and sold commercially under the above mentioned U.S. Pat. No. 3,969,446, and described in a brochure entitled "Ramco Water Recovery Systems" published by Ramco Sales, Inc. of San Pedro, Calif. in May 1985 and revised in February 1987, and first advertised in the February 1985 issue of *Aquaculture Magazine*. The prior art universally teaches that it is not feasible to locate an aerator that releases air bubbles any deeper in the body of water being treated than necessary because such aerators operate much less efficiently in deep water. The particular prior art device just mentioned made a limited exception to this rule, and lowered the point of introduction of air bubbles by only the few inches below the bottom of the fish pond being treated that were required to avoid any obstruction to seining the pond to harvest the fish. However, so far as applicant is aware, prior to the present invention no one had lowered the point at which gas bubbles are introduced far enough below the bottom of the body of water being treated—while at any given time removing only a small fraction of the water to be aerated and returned to the body of water—to achieve the advantages of the system, method and apparatus of this invention.

It has long been recognized that it is desirable, with air lift pumps used as diffusers, to draw water from a point deep in a pond. At the same time, it has been universally believed that the air must be introduced at a much shallower depth in order to minimize power consumption. Application has surprisingly discovered that with the system and method of this invention the advantages of a deep draw of water can be obtained, and at the same time the air diffuser can be operated very efficiently, even though the bubbles are introduced at an unusually deep point below the surface of the body of water being treated, and in fact well below the bottom of the body of water.

The so-called "U-tube" method of aeration of a moving stream of water—or of a body of water that is otherwise confined, but flows over a dam or weir located at one end of a basin in which the water is held to produce the hydrostatic head that is required for the method—has been known for many years. (See Richard E. Speece, "U-Tube Stream Reaeration," *Public Works*, August 1969, page 111, footnotes 1–4.) In this method the gas/liquid contact time is increased by introducing air bubbles near the top of one leg of a U-shaped tube, located below the bottom of a body of water, through which the entire body of water flows, first in the downward direction, then in the upward direction. In some applications, as an alternative to relying on the pressure from a head of water, the pressure that is required at the top of the downflow channel of the U-tube in order to produce a downward flow velocity great enough to counter the buoyancy velocity of the bubbles being introduced into the water is provided by a pump or other mechanical means.

A very considerable amount of research and development effort has been addressed to the improvement of U-tube aeration, in addition to other aeration techniques, as applied to the aeration and circulation of ponds used for fish culture, to the aeration of streams, and to the treatment of wastewater. As one example, the U-tube concept appears to have been employed not only for the aeration of natural streams but also in water treatment plants since 1958 (see Speece, above, page 111, footnote 4), and in fish aquaculture as well. And, as pointed out in 1979 by Nick C. Parker of the U.S. Fish and Wildlife Service Southeastern Fish Cultural Laboratory, Marion, Ala. (at the 1979 proceedings of the Fish Farming Conference and Annual Convention of Catfish Farmers of Texas, Jan. 17–19, 1979, at the Texas Agricultural Experiment Station, Texas A & M University), several investigators—including among others the above mentioned Richard E. Speece—had by 1969, 1971 and 1973, respectively, developed various techniques and equipment to increase aeration and circulation in aquaculture units.

It is significant also that air lift pumps have been known for far more than a century, whether employed within a body of water to be aerated or merely to raise the water to a higher level, as in an artesian well. Gas diffusers of one sort or another have likewise been known for more than a century. However, so far as applicant is aware, no one prior to applicant has combined (1) an air diffuser that functions as an air lift pump with (2) the concept of an underground flow path (3) for a quantity of water that is only a small fraction of the body of water being treated, to produce the system and method of the present invention.

The introduction and flow of air bubbles through large channels extending far below the bottom of a body of liquid has been employed in the so-called "deep shaft" system for carrying out the activated sludge process for treating liquid sewage. (See Bailey et al. U.S. Pat. No. 4,351,730 issued in 1982, with a publication date of May 18, 1977 for the corresponding patent in Great Britain, No. 1,473,665.) However, this has been for a special purpose—to diminish the land area required for sewage works of a given capacity—and this fact has resulted in a very different system and method of treatment of the body of liquid. The objective of reducing the required land area is achieved in the deep shaft system by continuously circulating a single stream, which is as large as practicable of as much of the so-called "mixed liquor" (the liquid sewage containing the previously developed biological floc particles that are referred to as "activated sludge") as is feasible.

In the language of the broadest claims of U.S. Pat. No. 4,351,730, the objective of reducing the required land area is achieved by "continuously circulating the bulk of sewage contained in the basin-downcomer-riser system at any one time" deep below ground level in a system of very large channels. This continuous circulation is accomplished by keeping an enormous volume of mixed liquor below ground level at all times—preferably as much as about 2 to about 6 or more times the volume of the mixed liquor that is in the basin above ground.

This emphasis on the circulation at all times of as much mixed liquor as feasible is directly contrary to applicant's emphasis (explained below) on circulating at any given time only a small fraction of the water in the body of water being treated.

In addition to requiring that a very large portion of the mixed liquor must be below ground at all times, Bailey et al. do not teach the use of fine air bubbles or even of medium size air bubbles. On the contrary, they teach the use of spargers, which can only result in the introduction into the mixed liquor of very large "bubbles," "slugs" or "blurps" of air.

It is reported that this deep shaft approach to the activated sludge process of treating sewage has been employed in numerous projects around the world since the mid-1970's. However, so far as applicant is aware, neither that extended use, nor the issuance in 1982 of the U.S. patent just referred to, nor the earlier publication (in 1977) of the corresponding British application for patent, suggested the present invention to anyone, whether in the field of water treatment, sewage treatment or fish aquaculture.

The teaching in Bailey et al. of the use of large slugs of air agrees with the conclusion of other skilled workers in this field that in an air lift pump a single air injection hole 1.25 cms. in diameter was preferable to a number of smaller holes. (Nick C. Parker and Mary Anna Suttle, "Design of Airlift Pumps for Water Circulation and Aeration in Aquaculture," 6 *Aquacultural Engineering* (1987) 97, 106–107.) The long held belief that fine bubbles should not be used in an airlift pump is shown by the acceptance on the part of the two authors just cited of the conclusion reached 63 years earlier that "small fine bubbles provided no advantage because small bubbles quickly coalesced into larger bubbles as they traveled up through the water column" of an airlift pump. (C. N. Ward, "An experimental study of airlift pumps," *Water Works* (1924) pgs. 1275–1278.)

SUMMARY OF THE INVENTION

The system and method of this invention are used to introduce gas bubbles into a pond, lagoon or basin that is employed in fish farming or other form of aquaculture by continuously removing a small amount of water from the body of water being treated, flowing it down underground, introducing gas bubbles into it, and then returning it to the body of water.

The quantity of water removed and treated in this way is a small fraction of the total volume of water that is contained in the body of water. One way of expressing this relationship is as the ratio of (1) the total volume of all channels taken together through which the water flows downward and then back up into the body of water to (2) the volume of the body of water being treated. When the invention is used for the treatment of the water in a fish culture pond, the indicated ratio will desirably be no more than about 1:1,000 for a pond containing an unusually high level of fish (in terms of pounds of fish per cubic foot of water), a maximum of about 1:3,000 for a pond containing an intermediate level of fish, a maximum of about 1:15,000 for a pond containing a low level of fish. Comparable ratios obtain for other forms of aquatic life, such as shrimp, crawfish, oysters and the like.

As will be seen, this means that even with a very large margin of safety to cover situations involving unusually high oxygen demands, the total volume of the water being circulated below ground (i.e., below the bottom of the body of water being treated) is at all times less than $\frac{1}{100}$ of the volume of the water above ground in the pond, lagoon or basin.

The body of water with which the system and method of this invention are used is substantially confined—as, for example, in a pond, lagoon, holding tank or other basin—against lateral movement in any direction around its outer perimeter. As used in this specification and the appended claims, the limitation "substantially confined against lateral movement" is met (1) even if relatively small portions of the water are drained off from the body of water, either intermittently or continuously, for some purpose other than to produce a hydrostatic head to operate a subterranean U-tube for diffusion of a gas into the water, or (2) even if, for some reason, a subterranean U-tube is employed to effect a relatively small amount of additional diffusion of a gas into the water as it flows from the pond, lagoon or other basin after having a gas diffused into it by one or more counterflow gas lift diffusers as described below.

The bottom of the pond, lagoon or basin may or may not be depressed below the level of the surrounding terrain. Thus a body of water to be treated by use of the system or method of this invention may, if desired, be contained within dams, dikes or walls that rise above the level of the adjacent land.

The system of this invention includes the body of water being treated and at least one counterflow gas lift diffuser. Each of the one or more diffusers includes an elongated, generally vertical downflow channel through which water taken from the body of water being treated flows downward, with at least a substantial portion of the downflow channel being located below the bottom of the body of water. The uppermost end of this downflow channel is in fluid communication with the body of water—either (1) by reason of being open, or (2) by being connected with the body of water through (i) an intermediate vertical channel, (ii) intermediate vertical channels, or (iii) laterally extending branches that provide communication with the body of water at various points that are located at a substantial distance from the downflow channel. The bottom end of the downflow channel is open. The channel is preferably otherwise fully enclosed, with solid, imperforate walls.

Each counterflow gas lift diffuser includes an elongated, generally vertical channel for returning water to the body of water being treated that has at least a substantial portion of its length below the bottom of the body of water, is in fluid communication with the body of water at its uppermost end and is open at its bottom end. The uppermost portions of the walls of the return channel should terminate, for at least a portion of the perimeter of the channel, below the surface of the body of water being treated.

The open bottom ends of the downflow and return channels are in enclosed fluid communication with each other. This communication may be direct, or it may be provided by a third channel that is separate from the downflow and return channels.

The size of the gas bubbles produced by the counterflow gas lift diffusers is an important part of this invention. Coarse gas bubbles no larger than about 15 mm. in diameter may be used in some applications, and medium size gas bubbles may be used in some other applications, but fine gas bubbles of good uniformity in size have been found to give the best results. For purposes of this specification and the appended claims, fine gas bubbles are defined as those that are approximately 2–4 mm. in diameter, and medium gas bubbles are considered those of approximately 4–9 mm. in diameter and coarse gas bubbles are considered those of approximately 10 mm. and larger. These sizes are consistent with the conventional definitions of fine, medium and coarse gas bubbles that are used in the water and wastewater treatment industry.

The return channel is preferably defined by a vertically oriented cylinder. In its preferred form, the downflow channel is provided by a space of substantially annular transverse cross section that is formed by a second, concentrically positioned cylinder outside the vertically oriented return channel just referred to.

It is preferred for many, but not for all, applications that both the downflow channel and its associated return channel be located substantially entirely below the bottom of the body of water.

The system and method of this invention may include as many or as few counterflow gas lift diffusers as are necessary and sufficient to achieve the purpose for which the system and method are used, so long as the below-ground/above-ground volume ratio discussed above does not rise above about 1:100. Likewise, the transverse dimensions of the elongated downflow and return channels may be any figure that is suitable for the purpose for which the system and method of this invention are used, so long as the same maximum below-ground/above-ground volume ratio of about 1:100 is not exceeded.

In addition to the number and size of the counterflow gas lift diffusers used, the effectiveness of any gasification treatment according to this invention is affected by how narrow and elongated the basin is in which the body of water being treated is contained, and therefore how narrow and elongated the body of water itself is. The ratio of (1) the average length of the basin (and thus of the body of water contained therein) to (2) the product of (a) the average width of the basin (and thus of the body of water) times (b) the number of gas lift diffusers of suitable capacity for the intended purpose, should not be too large or the gasification action will be inadequate. For best results, the body of water being treated should not be too narrow and elongated.

In some installations, the ratio just defined can be as large as about 10:1 or somewhat larger and the gasification of the liquid will be satisfactory for the intended purpose of the systems. In other applications, this ratio should preferably be no larger than about 5:1. In still other applications, the ratio should preferably be no more than about 2:1.

If the basin that contains the water being treated is not at least roughly rectangular in shape—for example, is circular or irregular in shape—the length and width in the ratios just defined should be the average length and average width of a rectangular body of water that approximates (as closely as possible) the shape of the basin in question, and has a surface area equivalent to that of the body of water in the actual basin.

The ratios given just above may be affected, in ways that will be understood by those skilled in the art, to some extent by the size and capacity of the individual gas lift diffusers that are used. The required diffuser size and capacity are determined primarily by the purpose for which the diffusers are used. Assuming that the diffusers employed are of substantially uniform size, each diffuser should be large enough in overall dimensions (and resulting capacity) that together they can affect the most remote portions of the body of water being treated. Because of this latter point, if the length-to-width ratio discussed above is too large, a suitable size diffuser may be too bulky for the width of the basin.

In the counterflow air lift diffusers used with the system and method of this invention, the inner diameter of a cylindrical pipe that defines the outer boundary of the downflow channel of the diffuser should preferably be no more than about 24", and the inner diameter of the cylindrical pipe that defines the return channel should preferably be no more than about 18".

A first bubble-introducing device is positioned in or below the return channel of each counterflow gas diffuser at a substantial distance, equal to at least about 2 feet, below the bottom of the body of water being treated. Improved results are obtained if this distance is at least about 3 feet, and it is preferred that it be at least about 5 feet.

In the use of the system and method of this invention, when gas bubbles are introduced into the water in the return channel of each of the one or more counterflow gas lift diffusers, the bubbles rise within the return channel of the diffuser, and some of them are at least partially absorbed by the water contained therein. At the same time, some of the gas bubbles (whatever their ultimate size may be) continue to rise within the water in the return channel for at least a distance that is sufficient to produce an upward flow of water within the return channel, and to produce a corresponding downward flow—or, in other words, a counterflow—of water within the downflow channel.

Various embodiments of counterflow gas lift diffusers are disclosed that involve bubble-introducing means at one or more locations. The first bubble-introducing device may be located, for example, in the vicinity of the open bottom end of the return channel, with substantially none of the gas bubbles being introduced into water located radially outward of the return channel open bottom end.

In another embodiment, the first bubble-introducing device is located generally within the vertical midportion of the return channel, and a second bubble-introducing device is located in the vicinity of the open bottom end of the return channel, again with substantially none of the gas bubbles being introduced by the second device into water located radially outward of the open bottom end of the return channel. The term "vertical midportion" of a channel (of whatever type) is used in this specification and claims to mean approximately the middle two-quarters of the length of the channel.

In still another embodiment of the counterflow gas lift diffuser that is used in the system and method of this invention, bubbles are introduced into the water both in the downflow channel and in the return channel, preferably at locations generally within the vertical midportions of the respective channels. In this case, the bubbles introduced into the return channel are of a sufficiently large size, and are introduced in sufficiently large quantities, that they overcome the tendency on the part of the bubbles that are introduced into the downflow channel to produce an upward flow of the water within the downflow channel. An upward flow of water is thus produced within the return channel, and a corresponding downward flow of water is produced within the downflow channel.

In addition to the above mentioned requirement that the first bubble-introducing means shall introduce gas bubbles at a level that is a substantial distance below the bottom of the body of water being treated, parameters are disclosed for the location of the lowermost bubble-introducing means in terms of the distance below the surface of the body of water being treated. When the gas to be introduced into the water in the return channel is atmospheric air, the lowermost bubble-introducing means is advantageously located a distance of about 6 feet to about 50 feet below the surface of the body of water being treated. Improved results are obtained when that distance is about 10 feet to about 40 feet, and for best results the distance should be about 30 feet.

When the gas to be introduced into the water in the return channel is liquified gas, the lowermost bubble-introducing means is advantageously located a distance of about 8 feet to about 50 feet below the surface of the body of water. Improved results are obtained when that distance is from about 20 feet to about 45 feet, and it is preferred that the distance be about 40 feet.

ADVANTAGES OF THE INVENTION

The system and method of this invention provide markedly improved aeration and mixing in any body of water with which they are used. Large volumes of water are moved, with lower levels of energy consumption than with conventional aerators.

The system and method increase the contact time of air bubbles in the body of water such as a fish pond, thereby improving the absorption of oxygen by the water being treated. The absorption is also improved by the fact that the air is introduced first into water derived from the bottom portion of the pond, which water has been the most depleted of oxygen and thus can absorb more.

The quantity of oxygen absorbed is presumably also improved by the very active surface reaeration, known as "surface boil," that has been observed to accompany the use of this invention. Three things appear to be responsible for this. First, it is believed that the requirement that at any given time no more than about $1/100$ of the above-ground volume of the body of water being treated is flowing through all the below-ground channels (downflow channel, return channel, and any connecting channel that may be present) of the one or more counterflow gas lift diffusers of the system (all taken together) is believed to provide the optimum condition for the form of surface reaeration under discussion. Second, the constant renewal of the air/water interface at the surface of the water also contributes to the improved surface boil that results from use of the system and method of this invention. Third, the increased pumping action produced by the long, confined path of the water flowing upward in the below-ground return channel also contributes.

In the preferred embodiments of the system and method, in which fine air bubbles are introduced, an increase in contact area between liquid and gas is also achieved, and oxygen transfer efficiency is thereby still further improved.

Another advantage in a fish culture pond is that, if a sufficient number of counterflow airlift diffusers are used, despite changes in the weather the temperature of the water in the pond tends to be maintained at the optimum level for the fish contained in the pond to feed and grow. This can extend the growing season significantly.

Still another advantage of the system of this invention is that it can be operated on substantially lower air pressures than conventional air diffuser devices which do not extend below ground and do not utilize applicant's counterflow principle. A conventional air diffuser positioned on the bottom of a body of water requires 1 p.s.i. of air pressure for every 26 inches of water. Ordinarily an additional 1 to 2 p.s.i. of air pressure is required to overcome friction due to the feed pipe and fittings. Finally, about ½ p.s.i. of air pressure is ordinarily required to overcome the resistance within whatever air diffuser is employed. These figures produce a total of about 8 to 9 p.s.i. or more for an air diffuser submerged in a body of water at a depth of approximately 15' below the surface of the water.

As will be seen, this is significantly higher than the approximately 6 p.s.i. of air pressure at which the counterflow air lift diffusers were operated at nearly the same depth—i.e., at the bottom end of channels that extended 10' below ground, or in other words 14' below the surface of the 4' deep ponds—in Example 2 below in this specification. This disparity in power consumption is true even if the lower figure is adjusted to approximately 6½ p.s.i. to reflect the one foot of additional depth for the conventional type of diffuser just referred to.

Surprisingly, use of the system and method of this invention also provides a savings—of as much as 20 percent—in the power required to produce a given gas flow rate with the counterflow diffuser of this invention located at a level well below the bottom of a pond, compared to the power required to operate a conventional air diffuser (without the counterflow feature) that is located at the level of the pond bottom, both diffusers being located the same distance below the surface of the water in the pond. It is believed that this savings in power may result in part from the fact that the head of water above the diffuser is not static. It may also result from the fact that the water is directed upward in the return channel as a confined column of water that is effectively less dense because of the entrained bubbles contained therein. This lower density produces in effect a lower head of water. The confinement of the water may also lead to the development of some momentum in the moving water column, after the upward flow is established and before the upwardly moving column of water leaves its confined space.

Not only is the power input (required to produce a given air flow rate) significantly lower with the system and method of this invention than the power required to produce that same flow rate with a conventional air diffuser submerged in water at the same distance below the surface of the water, but the output (in terms of standard aeration efficiency, or pounds of oxygen per horsepower per hour) is significantly higher. The use of the system and method of this invention thus produces substantial savings in two ways.

Use of this system and method prevents stratification of temperature as well as stratification of dissolved oxygen content. Moreover, it prevents stratification of suspended solids.

In the use of this invention, water is drawn from the lowermost point in a body of water and—rather than being continuously recirculated through the below-ground channels—is directed from the return channel upward to the surface of the body of water. This flow of water does not appear to stir the sediment resting on the bottom of the pond. However, at the same time, since the cooler water from the bottom of the pond tends to return to the bottom after it is moved to the top and has become highly oxygenated, this brings more highly oxygenated water down to the exposed surfaces of the sediment, so that decomposition of the sediment takes place more rapidly.

Since they can be installed entirely below the bottom of the body of water being treated, the counterflow gas lift diffusers used in the system and method of this invention need not interfere with navigation, water sports, or the harvesting of fish or other aquatic life.

The counterflow gas lift diffusers of this invention have no moving parts, are inexpensive, and are easily manufactured. Being of simple construction, they can be installed, maintained and operated without the expertise of skilled personnel. Properly constructed, they can be easily removed for maintenance or replacement.

Still other advantages will be apparent from the description of the system, method and apparatus of this invention given below.

BRIEF DESCRIPTION OF DRAWING

The invention will now be described in more detail in connection with the accompanying drawing, in which:

FIG. 3 is a fragmentary cross-sectional view of the upper end of a counterflow air lift diffuser similar to the diffuser in FIG. 1, but with the inner cylinder of the diffuser extending above the outer cylinder;

FIG. 4 is a fragmentary cross-sectional view of a second embodiment of the system of this invention, again showing one counterflow air lift diffuser in full and a portion of the body of water that is a part of the system;

FIG. 5 is a similar cross-sectional view of a third embodiment of the system of this invention;

FIG. 9 is a schematic, tranverse cross-sectional view of another embodiment of a counterflow air lift diffuser that can be used with the system of this invention;

FIG. 10 is a cross-sectional view of another embodiment of a counterflow air lift diffuser that can be used with the system of this invention in which helical baffles are included in the return channel;

FIG. 11 is a fragmentary cross-sectional view of the embodiment of FIG. 10, with each helical baffle having a plurality of small apertures spaced along the surface of the baffle;

FIG. 13 is a fragmentary cross-sectional view of the embodiment of FIG. 12, with a helical baffle that has a plurality of small apertures spaced along the surface of the baffle;

FIG. 14A is a similar schematic cross-sectional view of another embodiment of a counterflow air lift diffuser that can be used with the system of this invention in which a short, additional channel is interposed between the point at which water exits from the body of water being treated and the point at which water enters the downflow channel; and FIG. 15 is a longitudinal cross-sectional view of a pond of the type in which the experiments of Example 1 and parts of Example 2 described below were carried out, with counterflow air lift diffusers installed below ground near the middle of the pond.

DETAILED DESCRIPTION OF SPECIFIC EMBODIMENTS

Figure 1:
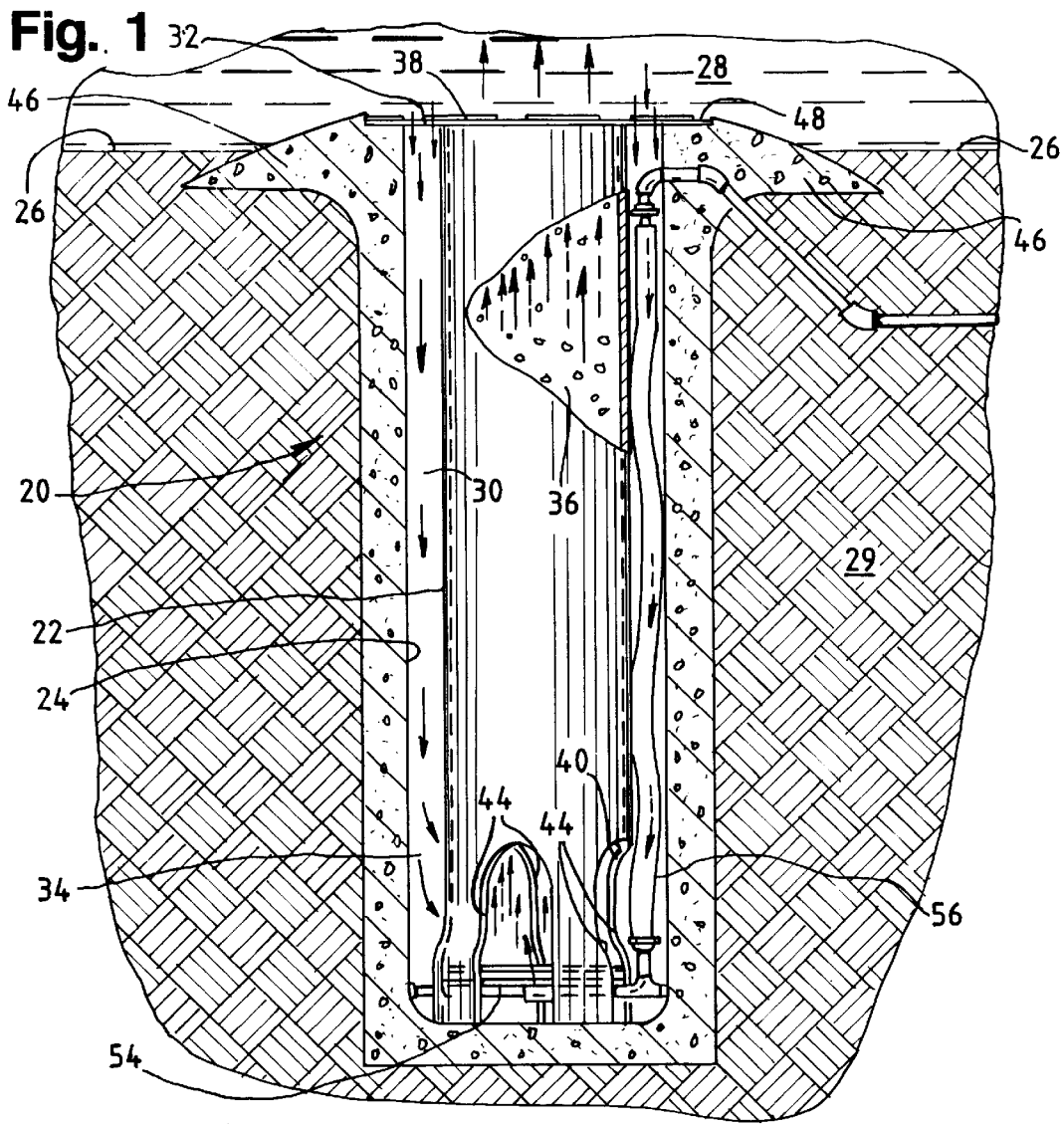
FIG. 1 is a fragmentary cross-sectional view of a first embodiment of the system of this invention, showing one counterflow air lift diffuser in full and a portion of the body of water that is a part of the system.

FIG. 1 shows a cross-sectional view of one embodiment of the system of this invention, including a full showing of a counterflow air lift diffuser and a partial showing of the body of water into which air bubbles are to be diffused.

General Construction

Counterflow air lift diffuser 20 includes two concentric cylinders 22 and 24 that are located substantially entirely below the bottom 26 of pond 28, buried in the surrounding earth 29. Outer cylinder 24 can be installed below bottom 26 by the use of any well known techniques such as are used in the installation of a caisson in the construction of a building, or in the drilling of a water well.

Inner cylinder 22 and outer cylinder 24 define between them space 30, which is annular shaped in transverse cross section. Space 30 provides an elongated, generally vertical downflow channel for flowing water from pond 28, as indicated by the downwardly directed arrows. At its upper end 32, downflow channel 30 is in fluid communication with the pond, and is open at its bottom end 34. Except for its open ends 32 and 34, outer cylinder 24 is fully enclosed, with solid, imperforate walls.

Cylinder 22 defines an elongated, generally vertical channel 36 for returning water to the pond, as indicated by the solid, upwardly directed arrows in the broken-away portion of the cylinder near its upper end. Top end 38 of the return channel is open to provide fluid communication with pond 28, and the return channel is open at its bottom end 40 as well. Positioning return channel 36 within downflow channel 30 helps to avoid "short circuiting" at the top end of the return channel, where the stream of newly aerated water flows out of the channel's open top end 38 and back into body of water 28.

Bottom end 42 of cylinder 24 provides enclosed fluid communication through ports 44 between open bottom ends 34 and 40, respectively, of downflow channel 30 and return channel 36. The space providing this enclosed fluid communication may also be characterized as a confined withdrawal space into which water flows through the downflow channel from the body of water, pond 28, that is being treated.

In the embodiment shown, inner cylinder 22 is formed of a suitable plastic such as polyvinyl chloride (PVC). It may also be formed of a metal such as stainless steel or of any other suitable material. In this embodiment, outer cylinder 24 is formed of concrete, but it may also be formed of any other suitable material.

As will be explained below, during use of this system air lift diffuser 20 operates to produce an upward current in return channel 36 and a corresponding downward current in its associated downflow channel 30. The downflow channel has a substantially uniform cross-sectional area throughout its length from its top end 32 to its bottom end 34, and return channel 36 has a substantially uniform cross-sectional area throughout its length from its bottom end 40 to its top end 38. In this embodiment the transverse cross-sectional areas of the two channels are substantially the same.

The enclosed fluid communication through ports 44 at the bottom of the air lift diffuser between the downflow channel and return channel should have a transverse cross-sectional area that is at least as large as the transverse cross-sectional area of the smaller of the downflow and return channels.

The concentric relationship of cylinders 22 and 24 that define downflow channel 30 and return channel 36 provides the simplest form of construction of this invention. In addition, this concentric relationship helps to produce a uniform draw of water (into the downflow channel) equidistant from the upper end of the air lift diffuser.

If desired, the two channels may be defined by non-cylindrical members, and may if desired be entirely separate. They need not be exactly vertical, so long as they are oriented generally vertically to guide water from pond 28 to a point well below the bottom of the pond, and to return water from that point to open top end 38 of the return channel.

In this embodiment, the upper end of cylinder 24 carries crown 46, which extends outwardly around the periphery of the upper end of the cylinder to help hold the device stably in place. The top end of the counterflow air lift diffuser shown in FIG. 1 extends slightly above the actual bottom 26 of pond 28, which provides space in the area around downflow channel 30 for the accumulation of some sediment, if that becomes necessary, without having the sediment drawn down into open top end 32 of downflow channel 30. If desired, this effect can be increased by raising the top end of the counterflow air lift diffuser still further, so long as this does not hinder the use of pond 28 in any way.

Figure 2:
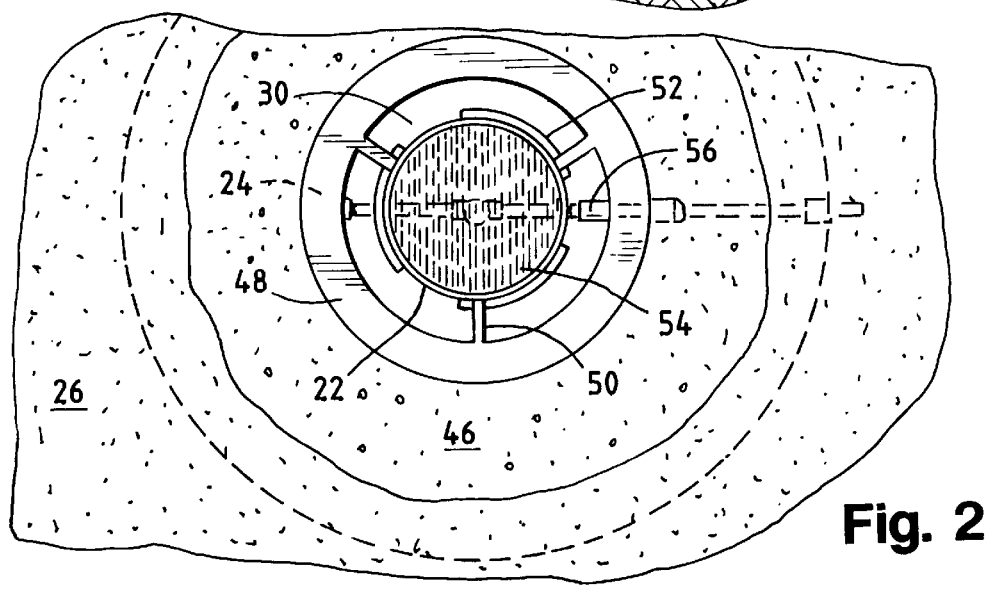
FIG. 2 is a fragmentary top plan view of the system of FIG. 1.

FIG. 2 is a fragmentary, top plan view of counterflow air lift diffuser 20 of FIG. 1. Downflow channel 30 is seen between inner cylinder 22 and outer cylinder 24 (the latter being obscured by outwardly extending flange 48 at the top end of the downflow channel). Struts 50 and brackets 52 hold the inner cylinder in place within the outer cylinder.

Bubbles Introduced At Single Location In Return Channel

The counterflow gas lift diffuser that is shown in FIGS. 1 and 2 includes a single diffuser for introducing air bubbles into the water in return channel 36. Air diffuser 54 is located in the vicinity of open bottom end 40 of cylinder 22. In the embodiment shown, the air diffuser lies below open bottom end 40, positioned so that substantially none of the air bubbles from the diffuser are introduced into water located radially outward of the open bottom end. This latter limitation, as will be seen, helps to avoid any interference by the bubbles rising from diffuser 54 with the downward flow of water in downflow channel 30.

In some situations it may actually be desirable to introduce air bubbles into water that is located radially outward of the open bottom end of return channel 36, especially if no bubbles are introduced into the downflow channel by other means such as are described in a later section below. Any such bubbles—which may advantageously be as much as 30 to 50 percent of the bubbles from a diffuser that has a wider transverse dimension than diffuser 54—will be introduced into the water beneath the open bottom end of downflow channel 30. The downward flow of the water at that point will tend to counteract the buoyant velocity of the bubbles, and thereby cause them to remain in the downflow channel and ultimately to follow a longer flow path that will help to improve the gas transfer efficiency of the system.

The air bubbles introduced into return channel 36 as described are preferably fine bubbles, approximately 2–4 mm. in diameter. The air diffuser illustrated in FIG. 1 is a flexible membrane diffuser with a large number of parallel, spaced slits permitting the escape of bubbles from the chamber below the membrane into which air under pressure is introduced from feed line 56.

Gas diffuser 54 introduces bubbles into the water in return channel 36 at a substantial distance, about 4 feet in this embodiment, below bottom 26 of the body of water. As indicated above, the confined upward flow of water within return channel 36 produces an increase in the contact time between the gas bubbles and the water, an observed improvement in "surface boil," and a decrease in power requirements, all of which results in an improved oxygen transfer efficiency. Satisfactory results are obtained with the system of this invention when the diffuser that introduces gas bubbles into the water in return channel 36 is located at a level that is below the bottom of the body of water by a distance of about 2 feet. Improved results are obtained if that distance is at least about 3 feet, and it is preferred that the distance be at least about 5 feet.

In order to balance the improved gas transfer efficiency obtained by use of the system of this invention against the power required to overcome the pressure of the static head of water at the point of introduction of the gas bubbles, it is ordinarily desirable, when the gas is atmospheric air, to locate the diffuser at a level from about 6 feet to about 50 feet below the upper surface of body of water 28. Improved results are obtained when the diffuser is located at a level from about 10 feet to about 40 feet below the upper surface of the body of water, and locating the diffuser at a level about 30 feet below the water surface is preferred. When the bubbles are derived from liquified oxygen these figures for satisfactory, improved and preferred results are about 8 feet to about 50 feet, about 20 feet to about 45 feet, and 40 feet, respectively.

As will be seen from the illustration and description of the system of this invention, when the gas that is introduced by gas diffuser 54 is air, the apparatus that has been described may be characterized as a counterflow air lift diffuser. When air bubbles are introduced by diffuser 54 into the water in return channel 36, the bubbles rise within the return channel. Some of these bubbles are absorbed by the water contained in the return channel, while some of them continue to rise within the water in the return channel for at least a distance sufficient to produce an upward flow of water within the channel. This, in turn, produces a corresponding downward flow of water within downflow channel 30, which water then flows through ports 44 and up through the return channel.

As is apparent, the described flow through return channel 36 provides a longer travel for the air bubbles produced by the air diffuser than if the diffuser were located in the conventional position on the bottom of the body of water. This lengthens the contact time between the liquid and the gas bubbles, and thus increases gas transfer efficiency. When the bubbles introduced into return channel 36 are fine bubbles, as is preferred, the contact area between the air and water is also increased.

If desired, bubbles may still be introduced at the single location shown, but single gas diffuser 54 may be replaced by a plurality of smaller diffusers, positioned if desired so that substantially none of the air bubbles from the diffusers are introduced into water located radially outward of the open bottom end of cylinder 22.

Alternative Constructions at Top End

In the embodiment of FIG. 1, the top ends of downflow channel 30 and return channel 36 both lie substantially at the level of bottom 26 of pond 28. If desired, inner cylinder 22' may be extended upward a distance to bring top end 38' of the return channel above top end 32' of the downflow channel. This alternative form of construction is shown in FIG. 3.

The advantage to this form of construction is that there will be less interference between the downward flow of water from the pond into downflow channel 30' and the upward flow of water out of top end 38' of return channel 36'. Inner cylinder 22' should not rise too far, of course, if it is necessary for some reason to keep the bottom of the pond relatively free of obstructions.

Another variation at the top end of counter flow airlift diffuser 20 may be used to distribute the points at which water flows from body of water 28 and enters downflow channel 30. This variation makes use of a plurality of laterally extending conduits that have outer ends in fluid communication with the body of water, to guide water from that body along several paths inwardly towards the downflow channel. This construction not only leads to drawing water from more widely spaced points in body of water 28, but avoids altogether any interference between the water flowing down from the body of water and the water being discharged upward from top end 38 of return channel 36 of the air lift diffuser.

Bubbles Introduced At Two Locations In Return Channel

FIG. 4 is a sectional view of another embodiment of a counterflow air lift diffuser that can be used with the system of this invention.

In this embodiment, inner cylinder 60 and concentric outer cylinder 62, which comprise counterflow air lift diffuser 63, are both located substantially entirely below bottom 26 of the body of water being treated. Elongated, vertical downflow channel 64 is located in the annular cross-sectional space defined by cylinders 60 and 62. At its upper end 66, the downflow channel is in direct fluid communication with the body of water. The downflow channel is open at its bottom end 68. Except for its open ends 66 and 68, outer cylinder 62 is fully enclosed, with solid, imperforate walls.

Inner cylinder 60 defines elongated, vertical channel 70 for returning water, with entrained air bubbles and absorbed oxygen, to body of water 28. Top end 72 of the return channel is open to provide fluid communication with the body of water. The return channel is open at its bottom end 74.

Enclosed fluid communication between the open bottom ends 68 and 74 of downflow channel 64 and return channel 70, respectively, is provided by bottom end portion 76 of outer cylinder 62 and ports 78 in inner cylinder 60.

In this embodiment, air diffuser 80, a first bubble-introducing means, is located generally within the vertical midportion of return channel 70. This diffuser is fed air under pressure by feed line 82. The diffuser may suitably be adapted to produce coarse air bubbles, which are usually defined as bubbles that are 10 mm. or larger in diameter. These air bubbles will produce an upward flow within return channel 70, in the manner of a conventional air lift pump. The air introduced through air diffuser 80 is typically atmospheric air.

Air diffuser 84, a second bubble-introducing means, is positioned below open bottom end 74 of return channel 70. Substantially none of the air bubbles introduced by diffuser 84 are introduced into water located radially outward of bottom end 74 of the return channel. Diffuser 84 is preferably adapted to introduce fine air bubbles, approximately 2–4 mm. in diameter, into the water in the return channel.

Air under pressure (or, if desired, liquified oxygen) is provided to diffuser 84 through feed line 86. In this embodiment, the gas feed line is located in the earth 88 outside outer cylinder 62.

The same parameters apply to the embodiment of FIG. 4 for the location of lowermost air diffuser 84, expressed in terms of the distance below bottom 26 of body of water 28, as are stated above for air diffuser 54 in the embodiment of FIG. 1. Likewise, the same parameters as are stated above for air diffuser 54 in FIG. 1, when expressed in terms of the distance of the air diffuser below the surface of body of water 28, apply to the location of air diffuser 84 in FIG. 4.

As with the embodiment of FIG. 1, the cylinders defining the downflow channel and the return channel can be installed below bottom 26 through use of any known techniques in the construction industry or in the well-drilling industry.

Cylinders 60 and 62 can be formed of stainless steel or of any other suitable material such as polyvinyl chloride or fiberglass. Counterflow air lift diffuser 63 has outwardly extending collar 90, formed of concrete, at its upper end. In this embodiment, the collar performs the same functions as with the embodiment of FIG. 1.

As will be seen from FIG. 4, the greatest amount of oxygen will be introduced into return channel 70 when both the first and second bubble-introducing means, diffusers 80 and 84, are operative. And, depending upon the size and quantity of bubbles desired, either diffuser 80 or 84 can be separately utilized.

Bubbles Introduced In Both Downflow And Return Channels

FIG. 5 is a sectional view of another embodiment of a counterflow air lift diffuser that can be used with the system of this invention in which the residence time of certain gas bubbles is increased by introducing bubbles into the downflow channel of the counterflow air lift diffuser as well as into the return channel.

In this embodiment, inner cylinder 92 and concentric outer cylinder 94, which comprise counterflow air lift diffuser 96, are both located substantially entirely below bottom 26 of the body of water being treated.

Elongated vertical downflow channel 98 is located in the annular cross-sectional space defined by cylinders 94 and 96. At its upper end 100, the downflow channel is in direct fluid communication with the body of water. The downflow channel is open at its bottom end 102. Except for its open ends 100 and 102, outer cylinder 94 is fully enclosed, with solid, imperforate walls.

Inner cylinder 92 defines the elongated, vertical channel 104 for returning water, with entrained air bubbles and absorbed oxygen, to body of water 28. Top end 106 of the return channel is open to provide fluid communication with the body of water. The return channel is open at its bottom end 108.

Enclosed fluid communication between the open bottom ends 102 and 108 of downflow channel 98 and return channel 104, respectively, is provided by bottom end portion 110 of outer cylinder 94 and ports 112 in inner cylinder 92.

In this embodiment, air diffuser 114, a first bubble-introducing means, introduces air bubbles (typically atmospheric air) into the water contained in return channel 104. Diffuser 114 is located generally within the vertical midportion of the return channel. It is fed by air under pressure from feed line 116.

The second bubble-introducing means, air diffuser 118, is located generally within the vertical midportion of downflow channel 98. Diffuser 118 is in this embodiment a circular pipe with a plurality of very small holes on its underside distributed around its perimeter. Diffuser 118 is fed air under pressure by feed line 120. If desired, liquified gas may be introduced through diffuser 118.

Air diffuser 118 is adapted to introduce fine gas bubbles having a diameter from about 2 mm. to about 4 mm. These bubbles are projected under pressure in a downward direction into the water in downflow channel 98.

The bubbles introduced into return channel 104 by diffuser 114 are larger than the bubbles introduced by diffuser 118 into the downflow channel. Since the bubbles from diffuser 118 have a tendency because of their buoyancy to rise within the downflow channel and produce an upward flow of water within that channel, the bubbles from first bubble-introducing means 114 must be of sufficiently small size, and introduced in sufficiently large quantities, that they overcome that tendency on the part of the fine bubbles introduced by second bubble-introducing means 118. Consequently, an upward flow of water is produced within the return channel, and a corresponding downward flow of water is produced within the downflow channel.

As will be seen, if some of the fine air bubbles introduced into downflow channel 98 by air diffuser 118 do rise within that channel and escape from upper end 100 of the channel, and thereafter rise through the body of water, they will still have had a somewhat longer contact time with the water than if they had been released at the bottom of pond 28 in the conventional manner. Moreover, as will be seen from FIG. 5, those fine air bubbles that are swept downward by the downward flow in channel 98 do have a possible contact time with the water (before being entirely absorbed) so far as the flow taking place in both directions below bottom 26 of pond 28 is concerned, that is almost twice as long as the contact time for the fine bubbles introduced into the return channels in the embodiments of FIGS. 1 and 4.

In the embodiment of the system of this invention shown in FIG. 5, the areas of the transverse cross sections of downflow channel 98 and return channel 104 are substantially equal. If desired the cross-sectional area of the downflow channel can be made smaller than the cross sectional area of the return channel, which will have the result of increasing the velocity of the water flow in the downflow channel. This in turn will make it more likely that that downward velocity will at all times be large enough to overcome the buoyant velocity of the air bubbles that are introduced into channel 98, so as to keep those bubbles from rising in downflow channel 98, and ensure that they will complete their downward path and thereafter rise in return channel 104.

The same parameters apply to the embodiment of FIG. 5 for the location of lowermost air diffuser 114, expressed in terms of the distance below bottom 26 of body of water 28, as are stated above for air diffuser 54 in the embodiment of FIG. 1. Likewise, the same parameters as are stated above for air diffuser 54 in FIG. 1, when expressed in terms of the distance of the air diffuser below the surface of body of water 28, apply to the location of air diffuser 114 in FIG. 5.

Return Channel Outlet Directs Flow of Water

Figure 7:
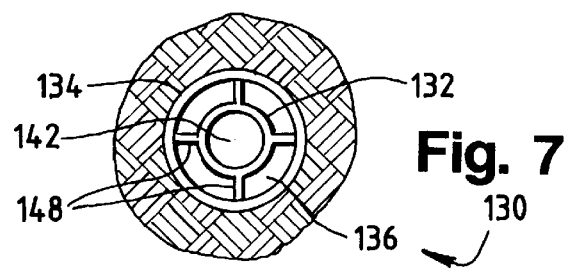
FIG. 7 is a cross-sectional view taken along line 7—7 in FIG. 6.
Figure 6:
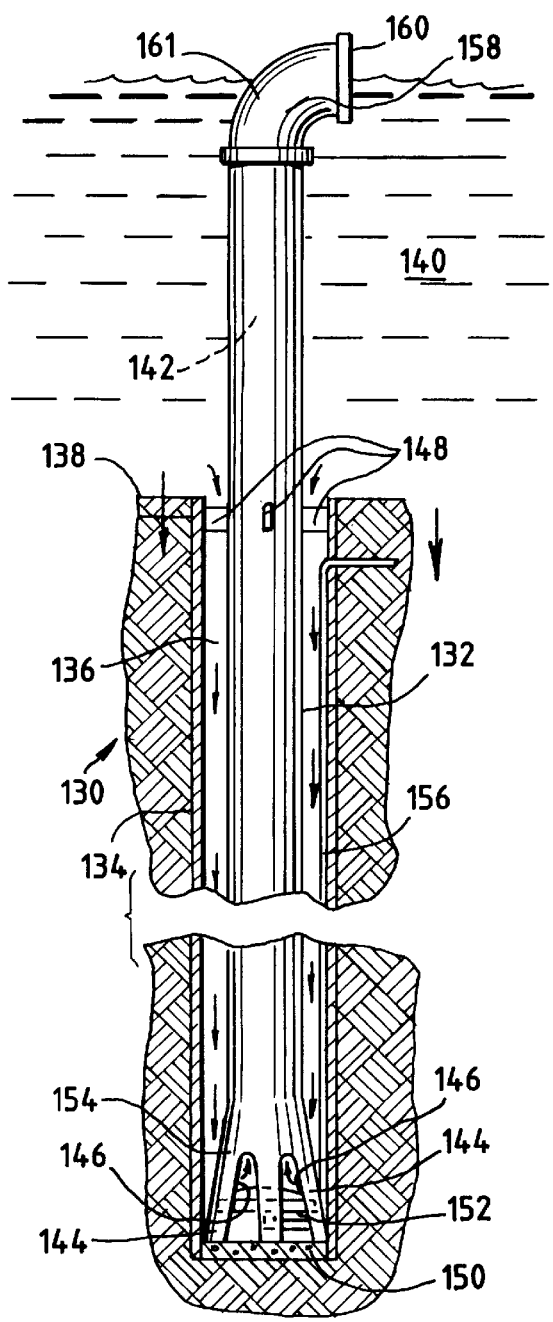
FIG. 6 is a fragmentary cross-sectional view of another embodiment of the system of this invention in which the return channel outlet directs the flow of water that is being returned to the body of water being treated.

FIGS. 6 and 7 illustrate an embodiment of this invention in which the return channel not only brings entrained and absorbed bubbles to the body of water being treated, but in addition directs the flow of the water when it is returned to the pond. FIG. 6 is a cross-sectional view of counterflow air lift diffuser 130 in which inner cylinder 132 and outer cylinder 134 form downflow channel 136 leading downward from bottom 138 of pond 140. Inner cylinder 132 defines return channel 142.

The construction of this embodiment of the invention is generally similar to the construction of the embodiment illustrated in FIGS. 1–3, with certain exceptions. Both cylinders 132 and 134 are formed of polyvinyl chloride. The bottom end of inner cylinder 132 is slotted at positions 144 to provide ports connecting downflow channel 136 and return channel 142. It is flared at its bottom portion 146 to provide a central positioning for the inner cylinder at the bottom, and is held in position at the top by centering tabs 148, which are shown in FIG. 7 in a cross-sectional view taken along line 7—7 in FIG. 6. Concrete slab 150 at the bottom end of outer cylinder 134 provides further stability.

Flexible membrane air diffuser 152 is positioned below open bottom end 154 of inner cylinder 132. The diffuser is fed by air under pressure from air feed line 156.

The principal difference between the operation of the embodiments of FIGS. 1–3 and the embodiment of FIG. 6 is that in the latter embodiment return channel 142 is extended upward to the vicinity of the upper surface of body of water 140, where it terminates in directional elbow 158. As will be seen, the air lift pump action of diffuser 152 will bring a flow of liquid to the surface of the water, where directional elbow 158 will direct water out of outlet 160 to the right in FIG. 6.

It is preferred that, as is the case with the embodiment of FIG. 6, uppermost portions 161 of the walls of return channel 142 terminate for at least a portion of the perimeter of the channel, below the surface of body of water 140.

If desired, directional elbow 158 can be made rotatable about the central axis of return channel 142, and one side of outlet 160 can be flattened somewhat, so that water directed out of elbow 158 will cause the elbow to rotate continuously to vary the direction in which the aerated water flows back into the body of water being treated.

In those cases in which the body of water being treated is of necessity more narrow and elongated than in the usual case, the effect of each gas lift diffuser can usually be increased by employing diffusers in which the return channel not only brings entrained and absorbed bubbles to the body of water, but in addition directs the flow of the water as it is being returned to the pond. The embodiment of this invention shown in FIGS. 6 and 7 and described above is one example of such a gas lift diffuser. In some installations, improved results will be obtained if the directional elbow at the top end of the return channel is not unidirectional, but instead is a bidirectional elbow or double elbow with outlets facing in opposite directions.

In the embodiment illustrated, the downflow channel and return channel extend below bottom 138 of pond 140 by a distance that is about two times the depth of the body of water.

Other Types of Bubble-introducing Devices

Any suitable bubble-producing means can be used with the system of this invention.

For example, as explained above, when an air diffuser of a flexible membrane type is employed, a plurality of such diffusers may be positioned at a given location in place of a single gas diffuser. A plurality of diffusers may be used in this manner at a given bubble-introducing location not only in the embodiment of FIG. 1 (which is specifically mentioned above) but also in any of the other embodiments of the system of this invention.

Figure 8:
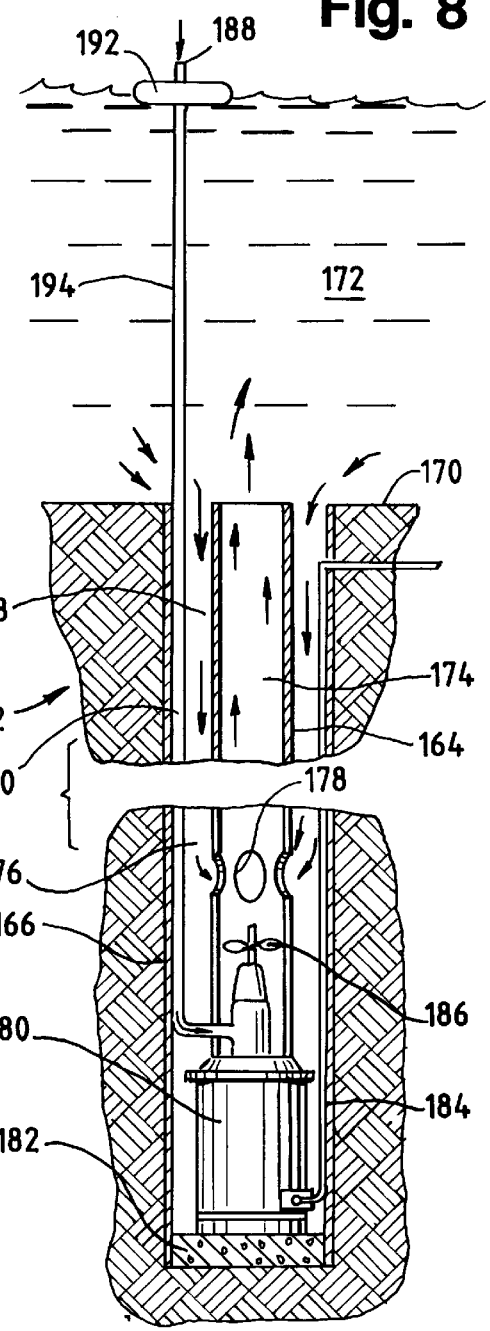
FIG. 8 is a fragmentary cross-sectional view of another embodiment of the system of this invention that utilizes an aspirator type aerator.

If desired, an aspirator type aerator may also be used to introduce bubbles into the water in the return channel in place of the air diffuser shown in FIG. 1. FIG. 8 shows an embodiment of the system of this invention in which the bubble-introducing means is an aspirator type aerator. FIG. 8 is a cross-sectional view (partly broken away) of counterflow air lift diffuser 162 in which inner cylinder 164 and outer cylinder 166 form downflow channel 168 leading downward from bottom 170 of pond 172. Inner cylinder 164 defines return channel 174.

Except for the type of aerator, the construction of this embodiment of this invention is generally similar to the construction of the embodiment illustrated in FIGS. 1 and 2 and described above. Both cylinders 164 and 166 are formed of polyvinyl chloride. Water at bottom 176 of downflow channel 168 passes through ports 178, which provide fluid communication between downflow channel 168 and return channel 174.

Aspirator type aerator 180 rests on concrete base 182 at the bottom of outer cylinder 166. Aerator 180 is a self-contained, water cooled device. Electric current is provided through conduit 184. Rapidly rotating propellers 186 produce a pressure drop that draws atmospheric air into intake port 188 above the surface of the water being treated, and down through air intake conduit 190 into aerator 180. The rotation of propellers 186 not only produces a high velocity upward movement of the water, in addition it subdivides the bubbles of air leaving aerator 180 into fine gas bubbles having diameters of approximately 2 mm. to 4 mm.

Inner cylinder 164 in this embodiment is supported on the top of aerator 180. If desired, centering tabs similar to members 148 in the embodiment of FIG. 6 may be used at the top of the apparatus to provide further stability to the inner cylinder.

Air inlet conduit 190 is supported at its upper end by float 192. When this embodiment is used to aerate a fish culture pond, it is ordinarily desirable for upper end 194 of conduit 190 to be flexible and of excess length, so that it can be moved out of the way when harvesting of the fish is to be carried out through seining.

Another type of bubble generator that is suitable for use as the bubble-introducing means employed with the system and method of this invention is the device disclosed in U.S. Pat. No. 3,452,966 and marketed by Polcon Corporation of Montreal, Canada.

Plurality of Hollow Risers in Return Channel

FIG. 9 is a schematic, transverse cross-sectional view of another embodiment of a counterflow air lift diffuser that can be used in the system of this invention.

In this embodiment, air lift diffuser 200 includes inner cylinder 202 and concentric outer cylinder 204, which define downflow channel 206 between them. Return channel 208 is defined by inner cylinder 202 and a plurality of hollow risers 210 positioned within that cylinder. These hollow risers, as well as the spaces in return channel 208 that the risers do not occupy, extend from the vicinity of the open bottom end substantially to the open top end of the return channel.

The smallest transverse dimension of each of the hollow risers is preferably at least about 15 mm. in diameter. It is known that the smaller the diameter of the riser in an air lift pump is, the better the pumping action will be. Thus, as the size of the riser decreases, the efficiency of the pumping action will increase until the point is reached where the riser has the same diameter as the bubbles used in the air lift pump.

These bubbles are typically no larger than about 10 mm. in diameter, but it is best not to reduce the riser size this far, because the increase in efficiency achieved by reducing the riser size must be balanced against the possible interference with absorption of the smaller air bubbles. The maximum feasible absorption rate is of course desired when the device is used, as is true here, not only as an air lift pump but also as an air diffuser. If the riser size is reduced so far that the larger bubbles (which provide the main lifting action) are permitted to crowd the smaller bubbles (which have a larger air-liquid contact area), the small bubbles may tend to coalesce and thus reduce the rate of absorption of air by the water.

In the embodiment of FIG. 9, there are 37 hollow risers 210, all of which have transverse cross sections of substantially the same circular shape and size. Risers 210 may have any other suitable cross-sectional shape, as for example octagonal, square or the like. The risers substantially fill the space enclosed by cylinder 202, which defines the outer boundary of elongated return channel 208.

If at least all those hollow risers 210 that lie along the perimeter of the bundle of risers shown in FIG. 9 are bonded to their adjacent risers along the perimeter, cylinder 202 may, if desired, be omitted. The bonding of these adjacent risers 210 around the perimeter of the plurality of risers must, however, be complete from the bottom to the top of return channel 208, in order to avoid the "short circuiting" of the rising column of water within the return channel that would result if part of the column of water flowing downward in downflow channel 206 were allowed to mix with the rising column of water in the spaces between the risers. For this reason, all risers 210 along the outer perimeter of the plurality of risers must be fully bonded at their areas of contact 212 if inner cylinder 202 is omitted. If desired, all of the plurality of risers within the interior of the group of risers may also be bonded together, by spot bonding or otherwise, to increase the structural stability of the group of risers, whether or not cylinder 202 is omitted.

Helical Baffle Arrangement In Return Channel

FIG. 10 is a longitudinal cross-sectional view, partly broken away, of another embodiment of a counterflow air lift diffuser that can be used to good advantage in the system of this invention.

Counterflow air lift diffuser 220 includes inner cylinder 222 and outer cylinder 224. Cylinders 222 and 224 define between them downflow channel 226. These cylinders are located substantially entirely below bottom 228 of body of water 230 being treated.

Center post 232 is positioned concentrically within inner cylinder 222. The post, which is preferably hollow, extends from the vicinity of open bottom end 234 to the vicinity of open top end 235 of return channel 236. In this embodiment the post terminates at its bottom end in inverted cone member 237. The post may terminate in any other suitably shaped member—such as, for example, a hemisphere—that will assist in dividing the bubbles rising from air diffuser 246 to direct streams of water with entrained bubbles outwardly to the annular open bottom end 234 of return channel 236.

Helical baffles 238A, 238B, and 238C are arranged between inner cylinder 222 and center post 232. Every exposed edge of these helical baffles is throughout its length in contact with the means that bounds the return channel. Thus, inner edge 240 of each of the helical baffles is throughout its length in contact with post 232, which defines the inner boundary surface of the return channel. Outer edge 242 of each helical baffle is throughout its length in contact with the inner surface of inner cylinder 222, which defines the outer boundary surface of the return channel. As will be seen, this arrangement of parts produces three helical passages that wind around post 232 from open bottom end 234 to open top end 235 of return channel 236.

Air diffuser 246 is located at the open bottom end of the return channel, in the space providing fluid communication (through ports 247) between open bottom ends 234 and 248, respectively, of the return channel and the downflow channel. Air is supplied to the diffuser under pressure from a feed line (not shown) at 248.

When bubbles of air rise from diffuser 246 they are deflected outward by inverted cone 237 to enter return channel 236. One-third of the bubbles move with the upwardly flowing water into the helical passageway formed between helical baffle 238A and helical baffle 238B. Another third of the bubbles enter the adjacent helical passage formed between helical baffle 2383 and 238C. Another third of the bubbles enter the helical passageway formed between helical baffle 238C and the returning helical baffle 238A as the latter winds around post 232.

As these streams of rising water and the bubbles contained in the streams flow upward, the helical paths followed by the streams (indicated by the arrows directed upward and to the right in FIG. 10) are longer than a straight path up through a cylindrical channel without the helical baffles would be. This fact increases the gas-liquid contact time appreciably. Thus, use of helical baffles as described improves still further the aeration achieved through use of the system and method of this invention.

In three prior art patents referred to above, U.S. Pat. Nos. 1,144,342, 3,452,966 and 3,852,384, helical baffles are employed to guide the upward water flow in an air lift diffuser. However, so far as is known, the use of helical baffles in conjunction with counterflow air lift diffusers located below the bottom of a pond or lagoon, as in the system and method of the present invention, has never before been considered.

In the embodiment of FIG. 10, the helical baffles extend all the way to the top of inner cylinder 222. In many cases, especially if the body of water being treated is deeper than usual, it will be desirable to terminate the helical baffles at a somewhat lower point within the counterflow air lift diffuser. This will permit the streams of water and entrained air bubbles that are flowing upward in helical paths to tend to straighten out and follow more nearly linear, vertical paths when they leave the return channel. This, in turn, will give the rising streams greater reaeration effect at the upper surface of the body of water being treated.

If desired, a series of small apertures may be distributed along helical baffles 238A, 238B, 238C, in a manner similar to what is shown in U.S. Pat. No. 1,144,342. If the tendency of the small bubbles to rise vertically upward, in spite of the helical forces exerted on them by the apparatus described, brings a substantial number of the smaller bubbles up into contact with the next adjacent helical baffle, where they may tend to collide with each other and coalesce, the indicated apertures will cause some of the bubbles to pass through the baffle into the lower portion of the next helical passage above. At the same time, the bubbles will tend to be broken up into smaller bubbles as they pass through the apertures. FIG. 11 is a fragmentary view of portions of helical baffles 238A', 238B' and 238C' showing apertures 250 distributed across the surface of the baffles.

If desired, the helical baffle arrangement that has been described for the return channel can be combined in the same counterflow air lift diffuser with a helical baffle such as is described below for the downflow channel.

In a simpler form of the counterflow air lift diffuser that may be used with the system and method of this invention, the center post may be omitted. In this embodiment, a helical baffle such as is described in U.S. Pat. No. 3,452,966 referred to above may be used to form two helical passages by twisting a single ribbon-like member and keeping each edge of the resulting member throughout its length in contact with the inner surface of the means (such as inner cylinder 222 in the embodiment of FIG. 10) that defines the inner boundary of the return channel.

The center post may also be omitted, if desired, by twisting a member that comprises a spine from which three ribbon-like members extend outward, thus forming three helical passages similar to those discussed in U.S. Pat. No. 3,852,384 referred to above.

Helical Baffle Arrangement In Downflow Channel

Figure 12:
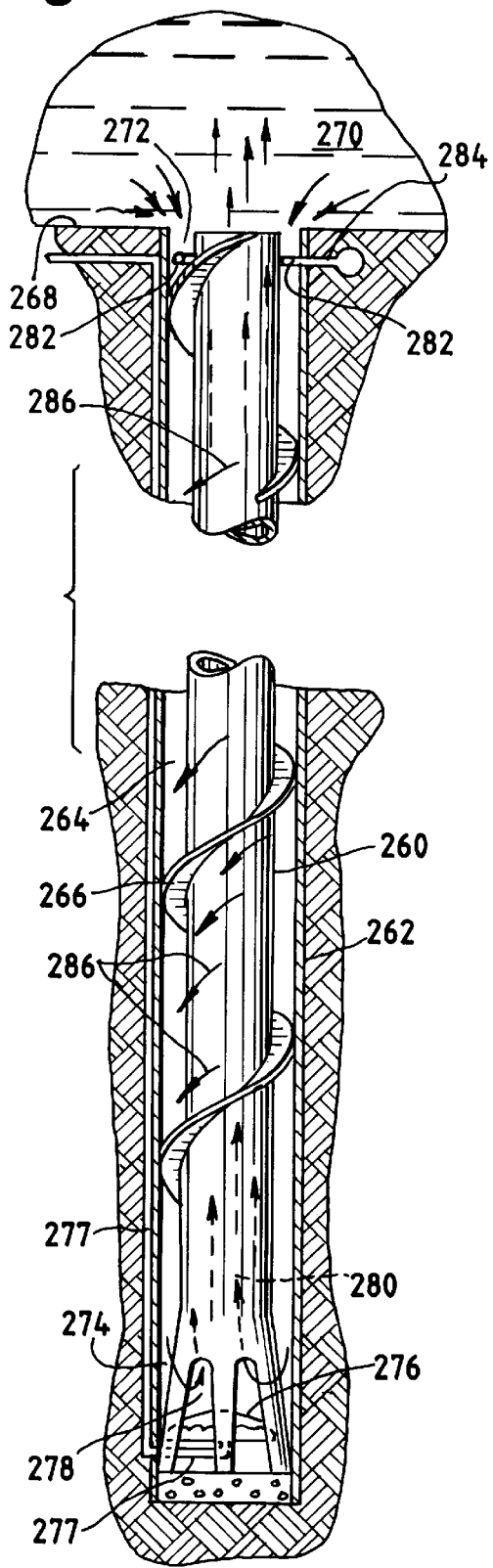
FIG. 12 is a cross-sectional view of another embodiment of a counterflow air lift diffuser that can be used with the system of this invention in which a helical baffle is included in the downflow channel.

FIG. 12 is a longitudinal cross-sectional view of another embodiment of a counterflow air lift diffuser that can be used to good advantage in the system of this invention. Inner cylinder 260 and outer cylinder 262 define the inner and outer boundaries of downflow channel 264. Both cylinders are located substantially entirely below bottom 268 of body of water 270 being treated. Helical baffle 266 extends from the vicinity of open top end 272 to the vicinity of open bottom end 274 of downflow channel 264.

Bubble-introducing means 276, which is supplied with air under pressure through feed line 277, is located beneath open end 278 of return channel 280. As bubbles rise from 276, water flows upward along with the bubbles through the return channel.

Air diffuser 282, located near top end 272 of downflow channel 264, is fed through air line 284. When bubbles from diffuser 282 enter downflow channel 264, they tend to follow the helical path defined by helical baffle 266, as indicated by arrows 286 directed to the left and downward in FIG. 12. The downwardly directed helical path followed by the water stream and its entrained bubbles is of course longer than a straight path down through an annular channel without the helical baffle would be. Thus, the gas-liquid contact time is increased.

If more than one helical baffle member is used, there will of course be a corresponding number of helical passages formed between adjacent parallel baffles.

As mentioned above, in certain prior art patents helical baffles are employed to guide the upward water flow in an air lift diffuser. However, so far as is known, the use of a helical path for the downward flow of bubble-laden water has never been considered prior to the present invention. This may be because the natural buoyancy of gas bubbles in water would be expected to overcome any spiral downward movement of the bubbles if the water flow were directed along a helical path by some means or other. Surprisingly, it has been found that this is not so. The gas bubbles in a counterflow air lift diffuser do unexpectedly flow downward—not upward—along the longer helical path in the downflow channel that is produced by the helical baffle interposed in that channel.

When the downflow and return channels have the same transverse cross-sectional area, gas transfer efficiency is additionally increased with this embodiment of the counterflow air lift diffuser because the same quantity of water has to flow downward in the downflow channel as flows upward in the return channel, which means that the downward flow over the longer, helical path must take place at a higher velocity than the upward flow in the return channel. This causes the spacing of the bubbles from each other to be "stretched out" as the water flow over the longer helical path speeds up, and the bubbles are thus more likely to remain small because they are less likely to collide with each other and coalesce into larger bubbles. This results in increased gas/liquid contact area, since each smaller bubble has a larger surface area for a given volume of gas than larger bubbles do.

On the other hand, if the downflow channel has a sufficiently larger transverse cross-sectional area than the return channel has, the gas transfer efficiency will be increased because the flow velocity along the long helical path in the downflow channel will then be no greater than (and may even be less than) the flow velocity along the straight, upward, vertical flow path in the return channel. This will increase both the length of the flow path and the length of the gas/liquid contact time for the water and entrained bubbles that are flowing downward in the downflow channel.

FIG. 13 is a fragmentary view of helical baffle 266' adapted to be positioned between inner cylinder 260 and outer cylinder 262, that has a plurality of small apertures 288 spaced along the helical baffle, for the same purpose as apertures 250 are included in helical baffles 238A', 238B' and 238C' for the return channel, as illustrated in FIG. 11.

As already mentioned, if desired the helical baffle just described for the downflow channel can be combined in the same counterflow air lift diffuser with the helical baffle arrangement described above for the return channel.

Series Of Channels To Extend Gas-Liquid Contact Time

Figure 14:
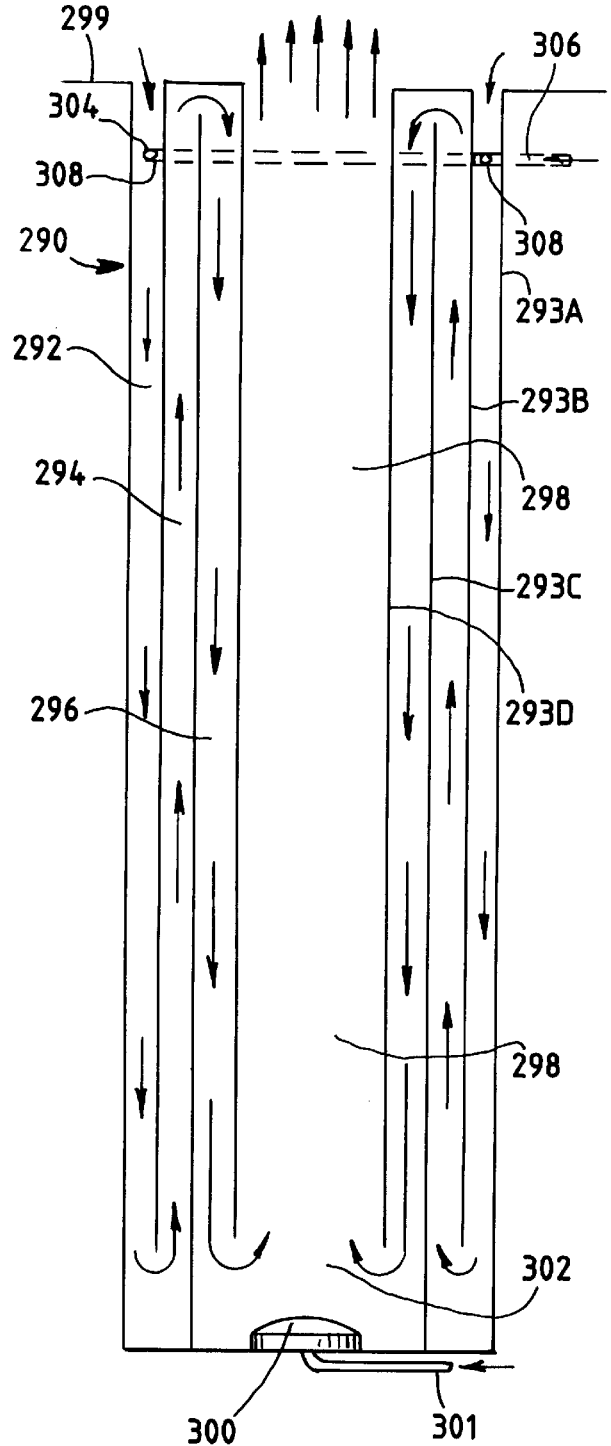
FIG. 14 is a schematic cross-sectional view of another embodiment of a counterflow air lift diffuser that can be used with the system of this invention in which two additional channels are interposed between the point at which water exits from the body of water being treated and the point at which water enters the ultimate downflow channel.

In another embodiment of the system of this invention (with which the counterflow air diffuser illustrated in FIG. 14 is used) a series of consecutive channels is employed to extend the gas-liquid contact, or bubble residence time, time still more.

In this embodiment, counterflow air lift diffuser 290 includes two other elongated channels in addition to the downflow and return channels shown in FIG. 1 and in various other Figures of the drawing—(1) initial downflow channel 292, into which water exiting from the body of water being treated flows initially and (2) an intermediate channel 294 for initial upward flow—in addition to final downflow channel 296 and return channel 298. As will be seen, elongated channels 292, 294, 296 and 298 (in that order) are connected in series to provide an enclosed fluid communication path through these four channels. In the embodiment shown, channels 292, 294, 296 and 298 are all located entirely below bottom 299 of the body of water being treated. Initial downflow channel 292 is formed by concentric cylinders 293A and 293B, intermediate upward flow channel 294 is formed by concentric cylinders 293B and 293C, downflow channel 296 is formed by concentric cylinders 293C and 293D and return channel 298 is formed by cylinder 293D.

Bubble-introducing means 300 (supplied with compressed air through feed line 301) is positioned below open bottom end 302 of final return channel 298. It provides bubbles that create in return channel 298 a rising stream of water carrying entrained bubbles. This rising stream in turn produces a stream that flows along the path indicated by the arrows in channels 292, 294 and 296.

Ring-shaped air diffuser 304, fed by air line 306, introduces bubbles into initial downflow channel 292 near the top of that channel, through apertures in bottom portion 308 of this ring-shaped diffuser. As will be seen, these bubbles introduced into initial downflow channel 292 then follow a path that extends through that initial downflow channel, intermediate channel 294 for initial upward flow, and final downflow channel 296, into open bottom 302 (if any bubbles remain undissolved at that point) of return channel 298.

If desired, increased bubble residence time can also be achieved by introducing bubbles into one or both of channels 294 and 296.

Fine Bubbles Introduced Into Downflow Channel Substantially Above Bottom Of Body Of Water As has been indicated, at least substantial portions of both the downflow channel and the return channel of the counterflow gas lift diffusers used in the system and method of this invention are located below the bottom of the body of water being treated, and in most cases the entire extent of both the downflow and return channels are so located. However, in order to obtain certain advantages substantial portions of these channels may also be located above the bottom of the body of water. For example, if the gas diffuser for introducing gas bubbles (usually fine bubbles) into the downflow channel is located at a level sufficiently close to the surface of the body of water, the diffuser can be reached easily for maintenance or replacement without having to drain the entire body of water.

Thus, the counterflow gas lift diffuser described above and illustrated in FIG. 5 can be modified by extending the central, return channel upward to a level that is located a short distance below the surface of the body of water, preferably equal to or greater than the diameter of the return channel. This distance may suitably be as much as about five feet. Improved results are obtained if the distance is no greater than about three feet, and it is preferred that the distance be no greater than about two feet below the surface of the water.

In the embodiment of the system and method of this invention under discussion, the outer cylinder that bounds the downflow channel rises to a level in the body of water that is below the top end of the central, return channel. The top end of the downflow channel may suitably be as much as about three feet below the top end of the return channel. Improved results are obtained if the top of the downflow channel is no more than about two feet below the top of the return channel, and it is preferred that it be no more than about one foot below the top of the return channel.

In any case, a gas diffuser for introducing fine gas bubbles into the downflow channel may be located within the downflow channel a short distance below the top open end of the downflow channel. At this level, the diffuser for fine gas bubbles—which may be a ceramic diffuser that is easily subject to fouling or other blocking of the fine apertures in the foraminous bubble-emitting surface of the diffuser—can be located only a short distance below the water surface, for easy maintenance or replacement of the diffuser.

Reversal of Downflow and Return Channels

If desired, the same advantage of the accessibility of the diffuser that supplies fine gas bubbles to the downflow channel can be achieved if concentric cylinders are used to define (1) a central downflow channel and (2) an outer, annular return channel, both of which channels rise above the bottom of the body of water being treated. In this embodiment, the upper end of the central, downflow channel is preferably located below the surface of the body of water by a distance at least equal to the internal diameter of the downflow channel.

The annular shaped return channel may terminate a substantial distance above the bottom of the body of water, suitably about one foot to about three feet below the top of the central channel, which is the downflow channel instead of the return channel in this embodiment. Preferably the upper end of the annular return channel is outwardly flared, as by positioning at that upper end an upwardly facing trumpet-shaped guide member around the cylinder that defines the central channel, to direct the aerated water that is returned to the body of water being treated away from the zone from which water is drawn down into the central downflow channel.

If desired, the embodiment that is illustrated in FIG. 14 may be modified—as shown schematically in FIG. 14A—by omitting the outermost, initial downflow channel of the former embodiment and raising the top ends of the initial upward flow channel, the final downflow channel and the return channel of that embodiment. In the embodiment of FIG. 14A, initial upward flow channel 309 is located entirely above bottom 310 of body of water 311 that is being treated, and the open bottom end 312 of this upward flow channel is open to the water in the bottom region of the body of water. This construction has the advantage, in a fish culture pond, of drawing into the counterflow gas lift diffuser water that is most in need of treatment because it has the lowest percentage of dissolved air or oxygen.

The level for upper end 313 of inner, return channel 314 in this embodiment is suitably about one foot to about three feet below the surface of the body of water being treated. In this embodiment, downflow channel 315 and initial channel 309 for upward flow—the top end portions of which are in fluid communication with each other—are normally closed off at their top ends from the surrounding body of water 311 by an annular shaped cap member 316.

Main air lift diffuser 317, fed by air line 318, is located at the bottom of the diffuser. Ring-shaped fine bubble gas diffuser 319 (shown in dashed lines) of this embodiment is located near the top end of downflow channel 315 or the top end of channel 309 for initial upward flow. It is fed by a source of gas (not shown) through any suitable member such as line 321 (also shown in dashed lines). The cap covering the top ends of channels 309 and 315 is removable, to provide convenient access to gas diffuser 319 for maintenance or replacement.

As will be seen, in the embodiment of FIG. 14A, open bottom end 312 of initial upward flow channel 309 is positioned approximately midway between the top and bottome ends of the counterflow gas diffuser. Upward flow channel 309 is in enclosed fluid communication at its upper end with the upper end of downflow channel 315.

Use of Propeller to Direct Water Upward In Return Channel

If desired, mechanical means such as a propeller may be substituted for a gas diffuser for directing the flow of water upward in the return channel in any of the counterflow gas lift diffusers used in this invention, so long as means is provided at some point in the flow path of the water for introducing gas bubbles into the water.

For example, when gas bubbles are introduced into the water in the downflow channel of a counterflow gas diffuser, such as by diffuser 118 in the embodiment illustrated in FIG. 5 of the accompanying drawing, a propeller or other means for directing the upward flow of water may be substituted for diffuser 114 of that embodiment. The propeller may be positioned in the vicinity of the open bottom end of the return channel, or at any desired higher location within the return channel.

The system and method of this invention will now be illustrated by several Examples set forth below.

EXAMPLE 1

In this Example, two counterflow air lift diffusers generally similar to the diffuser shown in FIG. 1 of the accompanying drawing were installed at points approximately one-third and two-thirds, respectively, along the longitudinal center line of a pond having about 0.7 surface acre and an average depth of about 4 feet. The pond was generally rectangular in plan, with an average length of about 300 feet and an average width of about 100 feet.

FIG. 15 gives a longitudinal cross section of the pond 320 and of its end walls 322 and bottom wall 324, with the two counterflow air lift diffusers installed below ground in the approximate positions just described, near the middle part of the pond.

The outer cylinder of each counterflow air lift diffuser was constructed of polyvinyl chloride pipe having an inside diameter of about 11½ inches. The inner cylinder was formed of the same material, with an inside diameter of about 8 inches and an outside diameter of about 8½ inches. The outer cylinder was 7 feet long, and it was installed with its top end substantially flush with the bottom 324 of the pond. The bottom of the pipe was filled with approximately one foot of concrete, to provide a base on which the concentrically located inner pipe was positioned with its top end also substantially flush with the bottom of the pond.

In this construction, both the annular space between the cylinders (the downflow channel) and the space within the inner cylinder (the return channel) were approximately 6 feet in length. The volume of the annular space forming the downflow channel in each of the two counterflow air lift diffusers was approximately 1.96 cubic feet. The volume of the space within the inner cylinder, or return channel, of each of the two diffusers was approximately 2.09 cubic feet. Thus the total volume of the below-ground channels in both diffusers taken together was approximately 8.1 cubic feet.

In comparison to this, the volume of the space occupied by the water in the pond was approximately 122,000 cubic feet. In other words, the volume of the body of water being treated was approximately 15,060 times the total volume of the space occupied by the water that at any given time was flowing through the below-ground channels of this Example. Although no fish were actually present in the pond during this test, this volume ratio was sufficient to maintain the water in the pond in proper condition for the culture of a low level of fish such as, for example, approximately 0.04 pound per cubic foot of water.

A 9" flexible membrane diffuser was installed at the bottom of each counterflow air lift device. Atmospheric air was supplied to these units at a rate of approximately 3 cfm at a pressure of approximately 2.5 p.s.i. The water discharged from one unit was measured (by use of a differential pressure gauge) at approximately 300 gallons per minute, or approximately 200,000 gallons per h.p. per hour.

The system was operated as described for several days during hot summer weather, along with a control pond containing no air diffuser of any type. After the first overnight use of the system for approximately 12 hours, the pond in which the air diffusers were located showed no observable stratification of temperature, and only slight stratification of oxygen. The water at the bottom of the pond measured 7.6 parts per million (ppm) of oxygen, and at the top measured 8.1 ppm of oxygen. At the same time, the control pond was significantly thermally stratified, and the oxygen readings at the bottom and top of the control pond were 0.5 ppm and 4.5 ppm, respectively.

Both ponds were monitored for several days, and the day-to-day results were similar to those detailed above.

EXAMPLE 2

In this Example, counterflow air lift diffusers generally similar to the diffuser used in Example 1, except that they had downflow and return channels that were each about 10' deep, were installed in each of five ponds. Three of the ponds were smaller than the other two.

Two counterflow air lift diffusers were installed in each of the three smaller ponds, at points equally spaced along the longitudinal center line of the pond. Four units were installed in each of the two larger ponds, at points equally spaced along the longitudinal center line of each of these ponds. The resulting installation of diffusers in each of the smaller ponds was approximately the same (except for the depth of the downflow and return channels) as that shown in FIG. 15 for Example 1.

The surface areas of the five ponds varied from approximately 0.68 acre to approximately 1.06 acres. Each pond had an average depth of about 4 feet.

As in Example 1, during the approximately 90-day test period of this Example, each pond contained an average of approximately 0.04 lb. of catfish for each cubic foot of water.

The volume of the downflow channel of each of the counterflow air lift diffusers used in this Example was approximately 3.27 cubic feet, and the volume of the return channel was approximately 3.49 cubic feet. Thus the total volume of the below-ground channels for the two air lift diffusers, taken together, in each of the smaller ponds was approximately 13.52 cubic feet, and for the four air lift diffusers, taken together, in each of the two larger ponds was approximately 27.04 cubic feet.

In comparison to this, the volume of the space occupied by the water in each of the five ponds ranged from approximately 118,500 cubic feet to approximately 184,700 cubic feet. In other words, the volume of the body of water being treated was from approximately 6,830 (for the largest pond) to approximately 8,765 (for the smallest pond) times the total volume of the space occupied by the water that at any given time was flowing through the below-ground channels.

A 9" flexible membrane diffuser of the same type as employed in Example 1 was installed at the bottom of the counterflow air lift devices in each of the ponds. Atmospheric air was supplied to the diffusers in four of the ponds at a rate of approximately 6 cfm at a pressure of approximately 6 p.s.i. However, no air was at first supplied to the diffusers in the fifth, or control, pond, which was the largest of the five ponds.

After overnight use of the five ponds for approximately 12 hours, the ponds in which the air diffusers were operative showed no observable stratification of temperature, and only slight stratification of oxygen. The water at the top of these ponds showed maximum saturation of oxygen, and within ½ part per million of saturation at the bottom. At the same time, the control pond with the inoperative diffusers was significantly thermally stratified, and the oxygen readings at the top and bottom of the control pond were 0.5 ppm and 3.5 ppm, respectively.

The four ponds with operative diffusers were used continuously—along with the control pond containing the inoperative diffusers—during about 90 days of hot summer weather. At the end of that period of time, the oxygen in the control pond had become so depleted that the fish congregated at the top of the pond "piping" for air. The fish in the other four ponds, in which the air diffusers were operative, stayed at their normal levels in their ponds, where the water continued to measure near saturation of oxygen.

The conventional way of reaerating a pond in which the dissolved oxygen has been reduced to such a dangerously low level as just described is to move a paddle wheel with a tractor into a position where the paddle wheel can splash the surface of the water in the pond for 10 to 20 minutes in order to provide sufficient oxygen to meet the biological oxygen demand in the depleted pond. To operate such a paddle wheel ordinarily requires a 60 h.p. engine.

The availability of the counterflow air lift diffusers in the control pond that were not operated during the 90-day test period made it possible—when the diffusers were finally turned on—to bring the oxygen level in the control pond up to the desired level in about the same length of time as a paddle wheel would have required, but with drastically reduced power requirements. By turning on the air diffusers in the control pond and operating them for approximately 15 minutes, the same results were achieved with a power requirement of only 0.8 h.p., as compared to the 60 h.p. that would have been needed to drive a typical paddle wheel.

EXAMPLE 3

The system of this Example is used for the treatment of the water in a fish culture pond that contains an unusually high level of fish in terms of pounds of fish per cubic foot of water, i.e., approximately 1 lb. per cubic foot.

The system used in this Example is similar to the system of Example 1, except that (1) the pond is only about 4' deep, with a resulting volume of about 52,270 cubic feet, and (2) only 3 counterflow air lift diffusers are installed in a regular pattern below the bottom of the pond.

This latter fact makes the total below-ground volume for all three counterflow air lift diffusers taken together approximately 52.0 cubic feet. Thus, the volume of the body of water being treated is approximately 1,005 times the total volume of the space occupied by the water that at any given time is flowing through the below-ground channels of all 3 diffusers used in this Example.

When the system of this Example is used in a fish culture pond, adequate levels of oxygen are present for improved growth and feed conversion, and to decompose the metabolic waste created by the feed and by the fish themselves.

EXAMPLE 4

The system of this Example is used for the treatment of water in a fish culture pond that contains an intermediate level of fish, i.e., approximately 0.1 lb. per cubic foot of water.

The system used is the same as the system of Example 3, except that only one counterflow air lift diffuser is installed beneath the bottom of the lagoon, near the center of the lagoon.

With only one-third as many counterflow air lift diffusers used in this Example as in Example 3, the volume of the body of water being treated is approximately 3,015 times the total volume of the space occupied by the water that at any given time is flowing through the below-ground channels of the diffuser.

When the system of this Example is used in a fish culture pond, substantially the same conditions are maintained as are maintained in Example 3 above.

EXAMPLE 5

Aerators and mixing devices are customarily evaluated by utilizing test procedures developed by the American Society of Civil Engineers. In this test, all the oxygen is first removed from a known volume of water through the introduction of sodium sulfite and cobalt chloride. After all the oxygen is removed, the aeration device that is being tested is turned on and allowed to run until reoxygenation is realized to near saturation levels. The dissolved oxygen levels are plotted over time and non-linear regression is employed, along with adjustments to correct for standard conditions, to determine the standard aeration efficiency (SAE), or more simply put, the pounds of oxygen transferred per horsepower per hour.

It has long been believed by those in the channel catfish farming industry that the preferred type of aerator for use in that industry is the paddle wheel type of aerator. In a test carried out at Auburn University in 1987, the SAE (pounds of oxygen transferred per horsepower per hour) of 21 different types and brands of commonly used aeration devices was determined. Two well known brands of paddle wheels were found in that test to have the highest SAE of the 21 devices tested—4.8 and 4.9, respectively. The only two diffused air systems that were evaluated in that test were found to have an SAE of 1.9 and 1.7, respectively, when submerged in approximately 4½ feet of water.

Diffused aeration companies calling on prospective customers in the wastewater treatment industry are commonly required to test their systems in accordance with the ASCE standards mentioned above. In one such test of a leading brand of a fine bubble diffuser that was carried out by an environmental engineering firm, the diffuser was found to have an SAE of 3.20 when submerged in water to a depth of 10 feet, 4.01 at a depth of 15 feet of water and 5.89 at a depth of 20 feet of water.

The same diffuser as just referred to was tested by applicant, in conjunction with the Department of Civil Engineering, Herff College of Engineering, Memphis State University, with the diffuser being utilized in accordance with the system and method of the present invention rather than being submerged in water at the various water depths involved in the test conducted by the environmental engineering firm just mentioned. A single counterflow air lift diffuser generally similar to the diffuser shown in FIG. 1 of the accompanying drawing was employed in this test at Memphis. The outside wall of the annular downflow channel was defined by a cylinder having an 18" internal diameter, and, the inside wall by a concentrically positioned cylinder having an outside diameter of approximately 12¼", with the top end of the downflow channel flush with the bottom of the basin and the bottom end of the downflow channel 10 feet below the bottom of the basin. The return channel was defined by the interior of the inside cylinders which had an inside diameter of 12". The top end of the return channel was also flush with the bottom of the basin.

As already indicated, the leading brand of bubble diffuser that is referred to just above was located below the bottom end of the return channel to be used as the bubble producing means of the system of this invention. The basin contained 85,000 gallons of water and had a side wall depth of 4½ feet. The volume of the body of water being treated was approximately 630 times the total volume of the space occupied by the water that at any given time was flowing through the described below-ground channels.

This test showed a standard aeration efficiency (SAE) of 16.2 pounds of oxygen per horsepower per hour for the system of this invention. It will be seen that this figure is approximately 4 times better than the SAE of the same leading brand of aeration device tested separately, since that separate test showed an SAE of 4.01 at 15 feet of water (see third paragraph above), and the same air diffusing device was located in applicant's test at a depth of 14½ feet (side wall depth of 4½ feet plus underground depth of 10 feet). The SAE figure of 16.2 pounds of oxygen per horsepower per hour that was produced through use of the system of this invention is approximately 3⅓ times better than the SAE that was measured for the two best paddle wheels used in the aquaculture industry—and more that 8 times better than the two diffused aeration devices when located 4½ feet below the surface of the water (see third paragraph above)—that were tested in the Auburn University test referred to above relating to the channel catfish industry.

EXAMPLE 6

In this Example, counterflow air lift diffusers were installed in salt water shrimp culture ponds to test the system and method of this invention in salt water. The system was installed in a 6 acre pond, and the pond was intensively stocked with shrimp on May 12, 1992.

The aeration units' annular cross-section downflow channels averaged 9½ feet in depth and were 18" in outer diameter and approximately 12" in inner diameter. The top of the downflow channel was flush with the bottom of the pond. The return channels averaged 9½' long and were outfitted with a 12" flexible membrane diffuser. The return channels' internal diameter was 12". The total horsepower supplied to the system was 0.83 horsepower per acre. There were two units installed per acre, making a total of twelve. The ratio of the aeration units' volume to pond volume was approximately 1:2,400.

The aeration units described aerated the shrimp pond satisfactorily until late June 1992, when a single 5 horsepower paddle wheel had to be added to augment the counterflow aeration system. This meant an additional ⅚, or 0.83, horsepower per acre, for a total of 1.66 horsepower per acre. In contrast to this, similar sized, comparably stocked ponds using only paddle wheels for aeration of the water were at this point using 5 horsepower per acre to maintain the same level of oxygen.

At the end of the study described in this Example in October 1992, the pond aerated according to the system of this invention yielded 2,883 pounds of shrimp per horsepower of aeration, while the comparable paddle wheel ponds yielded only 1,110 pounds of shrimp per horsepower. Additionally, the feed conversion ratio in the counterflow pond was 2.65:1, whereas in the paddle wheel pond a poorer conversion of 3.65:1 was realized.

EXAMPLE 7

There is a consensus among aquaculturists that in addition to keeping the water well oxygenated, maintaining good water circulation in ponds is very beneficial. Water circulation prevents thermal and chemical stratification. This makes the entire pond volume habitable and eliminates oxygen depletion at the mud/water interface, which is especially important, for example, in shrimp production.

In this Example, 18 counterflow air lift diffusers were installed in a basin that was approximately 54' wide, 900' long and 4.5' deep. The annular downflow channels were 18" in outside diameter, approximately 8¼" in inside diameter and 10' deep, with their top ends flush with the bottom of the basin. The return channels were 8" in inside diameter and were approximately 7' long, with their top ends also flush with the bottom of the basin. The bubble emitting device was a 7" diameter ceramic dome diffuser with a downwardly extending flange around its perimeter, which had a fine bubble emitting surface (including the flange) that was approximately 9" across. In addition to air supply lines, a chemical injection line was also provided for discharging dye into the downflow channel of each unit near the top of the channel. The ratio of the volume of the aeration units to the volume of the basin was approximately 1:688.

To determine how effectively the aeration units described would mix the water in the basin, blue dye was injected by the chemical distribution system into the downflow channel of each aeration unit and the air supply for each unit was promptly turned on. Within ten minutes, the water in the basin was approximately 80% mixed, and within fifteen minutes was completely mixed.

It is believed that this same test would require some 200–400 minutes to completely mix the water in the basin with conventional aerating systems.

While this invention has been described in connection with the best mode presently contemplated by the inventor for carrying out his invention, the preferred embodiments described and shown are for purposes of illustration only, and are not to be construed as constituting any limitation of the invention. Modifications will be obvious to those skilled in the art, and all modifications that do not depart from the spirit of the invention are intended to be included within the scope of the appended claims.

What is claimed is:

1. A system for diffusing gas bubbles into a body of water employed in an aquaculture operation, which comprises:
   a lake-like body of water of a given volume that is substantially confined against lateral movement in any direction around its entire perimeter and is dimensioned and maintained to hold predetermined types of aquatic life; and
   at least one counterflow gas lift diffuser, each of which diffusers comprises:
   (a) means defining an elongated downflow channel through which water taken from said body of water flows downward, said downflow channel (i) having at least a substantial portion of its length that is located below the bottom of the body of water and is buried in the ground beneath said bottom, (ii) at its uppermost end, being in fluid communication with the body of water and (iii) being open at its bottom end;
   (b) means defining an elongated channel for returning water to said body of water, said return channel (i) having at least a substantial portion of its length that is located below the bottom of the body of water and is buried in the ground beneath said bottom, (ii) at its uppermost end, being in fluid communication with the body of water and (iii) being open at its bottom end;
   (c) means providing enclosed fluid communication between the open bottom ends of the downflow channel and the return channel,
   said downflow channel, return channel and fluid communication means extending no lower than about 50 feet below the surface of said body of water,
   the ratio of (i) the total volume located below the bottom of said body of water that is occupied by said downflow channel, its associated return channel, and the means providing enclosed fluid communication between said two channels, in all said at least one counterflow gas lift diffuser in the system taken together, to (ii) the volume of said body of water that is located above said bottom being at all times less than about 1:100; and
   (d) first means for introducing gas bubbles into the water in the return channel of each of said at least one counterflow gas diffuser at a substantial distance, equal to at least about two feet, below the bottom of said body of water, but no more than about 50 feet below the surface of the body of water,
   whereby when gas bubbles are thus introduced into the water in the return channel of each of said at least one counterflow gas lift diffuser, the bubbles rise within the return channel, and some of the bubbles are at least partially absorbed by the water contained in the return channel, while some of the bubbles continue to rise within the water contained in the return channel for at least a distance that is sufficient to produce an upward flow of water within the return channel and to produce a corresponding downward flow of water within the downflow channel.

2. The system of claim 1 in which said first bubble-introducing means introduces bubbles into the return channel at a level at least about three feet below the bottom of said body of water.

3. The system of claim 1 in which said first bubble-introducing means introduces bubbles into the return channel at a level at least about five feet below the bottom of the body of water.

4. The system of claim 1 in which said first bubble-introducing means is located in the vicinity of the open bottom end of the return channel, said bubble-introducing means having a bubble-emitting surface with an area which is at least as large as the cross-sectional area of the return channel but not so large that any substantial quantity of bubbles is introduced by said bubble-introducing means into water located radially outward of the return channel open bottom end.

5. The system of claim 1 in which,
   (a) said first bubble-introducing means is located generally within the vertical midportion of the return channel, and
   (b) second means is provided for introducing gas bubbles into the water in the return channel, said second bubble-introducing means being located in the vicinity of the open bottom end of the return channel, said second bubble-introducing means being adapted to introduce smaller gas bubbles into the water in the return channel than said first bubble-introducing means introduces into said channel,
   whereby bubbles rising from said first bubble-introducing means, and bubbles rising from said second bubble-introducing means, together produce an upward flow of water within the return channel and a corresponding downward flow of water within the downflow channel.

6. The system of claim 1 in which second means is provided for introducing gas bubbles into the water in the downflow channel, the bubbles from said first bubble-introducing means that rise in the return channel being of sufficiently small size, and being introduced in sufficiently large quantities, that they overcome the tendency to produce an upward flow of water within the downflow channel on the part of the bubbles that are introduced into the downflow channel by said second bubble-introducing means, whereby an upward flow of water is produced within the return channel and a corresponding downward flow of water is produced within the downflow channel.

7. The system of claim 1 in which said downflow channel and said return channel are concentrically located, with the inner channel being the return channel.

8. The system of claim 7 in which the inner, return channel is substantially circular in transverse cross section, and the outer downflow channel is substantially annular in transverse cross section.

9. The system of claim 8 in which the top end of the return channel extends above the top end of the downflow channel.

10. The system of claim 1 in which said means defining the elongated return channel includes a plurality of hollow risers extending from the vicinity of the open bottom end substantially to the open top end of the return channel.

11. The system of claim 10 in which said hollow risers are positioned within an elongated member that defines the outer boundary of the return channel, the space enclosed by said member that defines the outer boundary of the return channel is substantially filled by the risers, and each of said hollow risers has substantially the same transverse cross-sectional shape and size.

12. The system of claim 1 in which at least one helical baffle extends from the vicinity of the open bottom end to the vicinity of the open top end of the return channel, and every exposed edge of said at least one helical baffle is throughout its length in contact with the means that bounds the return channel, whereby at least one helical passage for the rising stream of water is formed within the return channel.

13. The system of claim 12 in which the inner boundary surface of the return channel is defined by the outer surface of a center post positioned concentrically within the return channel, said center post extending from the vicinity of the open bottom end to the vicinity of the open top end of the return channel, the inner edge of each of said one or more helical baffles being throughout its length in contact with the outer surface of said post, and the outer edge of each of said one or more helical baffles being throughout its length in contact with the inner surface of the means that defines the outer boundary surface of the return channel, whereby at least one helical passage for the upwardly flowing stream of water is formed within the return channel.

14. The system of claim 1 in which at least one helical baffle extends from the vicinity of the open top end substantially to the bottom end of the downflow channel, the inner edge of said at least one helical baffle being throughout its length in contact with the surface of the means that defines the inner boundary surface of the downflow channel, and the outer edge of said at least one helical baffle being throughout its length in contact with the inner surface of the means that defines the outer boundary surface of the downflow channel, whereby at least one helical passage for the downwardly flowing stream of water is formed within the downflow channel.

15. The system of claim 13 or 14 in which each of said one or more helical baffles contains a plurality of small apertures spaced along its length.

16. The system of claim 1 in which the ratio of (a) the average length of the body of water into which gas bubbles are introduced to (b) the product of (i) the average width of the body of water and (ii) the number of gas lift diffusers used in the system is no larger that about 10:1.

17. The system of claim 1 in which said counterflow gas lift diffuser includes, in addition to the downflow channel and return channel recited therein:

(a) means defining an elongated initial upward flow channel, said initial upward flow channel having (i) an open bottom end for admitting water from the body of water with which the diffuser is used and (ii) an upper end in enclosed fluid communication with the upper end of said downflow channel; and (b) second means for introducing gas bubbles, when the diffuser is installed for use with said body of water, into the water in at least one of said downflow channel and said initial upward flow channel.

18. The system of claim 17 in which said counterflow gas lift diffuser includes, in addition to the downflow channel and return channel referred to therein and the initial upward flow channel recited therein:

(a) means defining an elongated initial downflow channel through which water exiting from the body of water being treated first flows, said initial downflow channel being connected with said initial channel for upward flow to provide enclosed fluid communication with the latter channel; and (b) second means for introducing gas bubbles into the water in at least one of said downflow channel, said initial upward flow channel and said initial downflow channel.

19. The system of claim 1 in which a portion of the perimeter of the open top of the return channel lies above the surface of the body of water being treated, and a portion of said perimeter lies below the surface of said body of water.

20. A method of diffusing gas bubbles into a lake-like body of water of a given volume that is employed in an aquaculture operation and is substantially confined against lateral movement in any direction around its entire perimeter, which method comprises the steps of:

(a) flowing water taken from said body of water downward through a fully enclosed downflow channel that is part of at least one counterflow gas lift diffuser, which downflow channel has at least a substantial portion of its length located below the bottom of the body of water, into a confined withdrawal space that extends no lower than about 50 feet below the surface of said body of water;

(b) flowing water from said confined withdrawal space back upward into the body of water through a return channel that is another part of said at least one counterflow gas lift diffuser, which return channel has at least a substantial portion of its length located below the bottom of the body of water, the ratio of (i) the total volume located below the bottom of said body of water that is occupied by said downflow channel, its associated return channel and the confined withdrawal space, in all said at least one counterflow gas lift diffuser taken together, to (ii) the volume of said body of water that is located above said bottom being at all times less than 1:100; and (c) introducing gas bubbles into the water in the return channel of each of said at least one counterflow gas lift diffuser at a substantial distance, equal to at least about two feet, below the bottom of said body of water, but no more than about 50 feet below the surface of the body of water, whereby the gas bubbles rise within the return channel of each of said at least one counterflow gas lift diffuser, and some of the gas bubbles are at least partially absorbed by the water contained in said return channel, while some of the gas bubbles continue to rise within the water contained in the return channel for at least a distance that is sufficient to produce an upward flow of water within the return channel, and to produce a corresponding flow of water downward through the downflow channel into said withdrawal space and from there into the return channel.

21. The method of claim 20 in which gas bubbles are introduced into the water in the return channel of each of said at least one counterflow gas diffuser at a level at least about three feet below the bottom of the body of water.

22. The method of claim 20 in which gas bubbles are introduced into the water in the return channel of each of said at least one counterflow gas diffuser at a level at least about five feet below the bottom of the body of water.

23. The method of claim 20 in which gas bubbles are introduced into the water in the return channel of each of said at least one counterflow gas diffuser in the vicinity of the open bottom end of the return channel, said bubble-introducing means having a bubble-emitting surface with an area which is at least as large as the cross-sectional area of the return channel but not so large that any substantial quantity of bubbles is introduced by said bubble-introducing means into water located radially outward of the return channel open bottom end.

24. The method of claim 20 in which:
  (a) gas bubbles are introduced into the water in the return channel of each of said at least one counterflow gas diffuser at a level generally within the vertical midportion of the return channel, and
  (b) gas bubbles are also introduced into the water in the return channel in the vicinity of the open bottom end of the return channel, and said last mentioned bubbles are smaller than said first mentioned bubbles,
  whereby all said bubbles rise together to produce an upward flow of water within the return channel and a corresponding downward flow of water within the downflow channel.

25. The method of claim 20 in which gas bubbles are also introduced into the water in the downflow channel of each of said at least one counterflow gas diffuser, the bubbles introduced into the return channel being of sufficiently small size, and being introduced in sufficiently large quantities, that they overcome the tendency to produce an upward flow of water within the downflow channel on the part of the bubbles that are introduced into the downflow channel,
  whereby an upward flow of water is produced within the return channel and a corresponding downward flow of water is produced within the downflow channel.

26. The method of claim 20 in which:
  (a) gas bubbles are introduced into the return channel of each of said at least one counterflow gas diffuser at a level at least about three feet below the bottom of said body of water, and
  (b) the downflow channel and the return channel are concentrically located, with the inner channel being the return channel.

27. The method of claim 20 in which the elongated return channel includes a plurality of hollow risers extending from the vicinity of the bottom end substantially to the top end of the return channel.

28. The method of claim 20 in which at least one helical baffle extends from the vicinity of the bottom end to the vicinity of the top end of the return channel, every exposed edge of said at least one helical baffle being throughout its length in contact with the means that bounds the return channel, whereby at least one helical passage for the rising stream of water is formed within the return channel.

29. The method of claim 20 in which at least one helical baffle extends from the vicinity of the open top end substantially to the bottom end of the downflow channel, the inner edge of said at least one helical baffle being throughout its length in contact with the surface of the means that defines the inner boundary surface of the downflow channel, and the outer edge of said at least one helical baffle being throughout its length in contact with the inner surface of the means that defines the outer boundary surface of the downflow channel,
  whereby at least one helical passage for the downwardly flowing stream of water is formed within the downflow channel.

30. The method of claim 20 in which the ratio of (a) the average length of the body of water into which gas bubbles are introduced to (b) the product of (i) the average width of the body of water and (ii) the number of gas lift diffusers used in the method is no larger than about 10:1.

31. The method of claim 20 in which said counterflow gas lift diffuser includes, in addition to the downflow channel and return channel recited therein:
  (a) means defining an elongated initial upward flow channel, said initial upward flow channel having (i) an open bottom end for admitting water from the body of water with which the diffuser is used and (ii) an upper end in enclosed fluid communication with the upper end of said downflow channel; and
  (b) second means for introducing gas bubbles, when the diffuser is installed for use with said body of water, into the water in at least one of said downflow channel and said initial upward flow channel.

32. The method of claim 31 in which said counterflow gas lift diffuser includes, in addition to the downflow channel and return channel referred to therein and the initial upward flow channel recited therein:
  (a) means defining an elongated initial downflow channel through which water exiting from the body of water being treated first flows, said initial downflow channel being connected with said initial channel for upward flow to provide enclosed fluid communication with the latter channel, and
  (b) second means for introducing gas bubbles into the water in at least one of said downflow channel, said initial upward flow channel and said initial downflow channel.

33. The method of claim 20 in which a portion of the perimeter of the open top of the return channel lies above the surface of the body of water being treated, and a portion of said perimeter lies below the surface of said body of water.

* * * * *